United States Patent
Sekiya et al.

(10) Patent No.: US 7,848,250 B2
(45) Date of Patent: Dec. 7, 2010

(54) WIRELESS COMMUNICATION APPARATUS AND WIRELESS COMMUNICATION METHOD ENABLING SWITCHING OF COMMUNICATION CHANNEL

(75) Inventors: Masahiro Sekiya, Inagi (JP); Tomoko Adachi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 103 days.

(21) Appl. No.: 12/261,494

(22) Filed: Oct. 30, 2008

(65) Prior Publication Data

US 2009/0116400 A1    May 7, 2009

(30) Foreign Application Priority Data

Nov. 2, 2007   (JP) .............................. 2007-286574

(51) Int. Cl.
*H04B 7/00* (2006.01)
*H04W 4/00* (2009.01)

(52) U.S. Cl. .................... 370/252; 370/329; 370/341

(58) Field of Classification Search ................ None
See application file for complete search history.

(56) References Cited

U.S. PATENT DOCUMENTS

| 7,263,366 B2 | 8/2007 | Miyashita | |
|---|---|---|---|
| 2004/0085896 A1* | 5/2004 | Banerjea et al. | 370/228 |
| 2004/0132411 A1* | 7/2004 | Li | 455/67.13 |
| 2004/0179549 A1* | 9/2004 | Ophir et al. | 370/474 |
| 2006/0056344 A1* | 3/2006 | Roy et al. | 370/329 |
| 2006/0239225 A1* | 10/2006 | Cho et al. | 370/329 |
| 2006/0242457 A1* | 10/2006 | Roy et al. | 714/12 |
| 2006/0286935 A1 | 12/2006 | Utsunomiya et al. | |
| 2007/0064783 A1* | 3/2007 | Kuroda et al. | 375/222 |
| 2007/0218890 A1* | 9/2007 | Cho et al. | 455/422.1 |
| 2007/0270102 A1* | 11/2007 | Zhu et al. | 455/69 |
| 2008/0070509 A1* | 3/2008 | Kish | 455/67.13 |
| 2008/0084855 A1* | 4/2008 | Rahman | 370/342 |

FOREIGN PATENT DOCUMENTS

JP    2007-5897    1/2007

* cited by examiner

*Primary Examiner*—Chi H Pham
*Assistant Examiner*—Soon-Dong D Hyun
(74) *Attorney, Agent, or Firm*—Oblon, Spivak, McClelland, Maier & Neustadt, L.L.P.

(57) ABSTRACT

A wireless communication apparatus includes a transmission and reception unit, a monitoring unit, and a control unit. The transmission and reception unit transmits and receives a frame to and from a wireless communication terminal. The monitoring unit monitors an interference signal in a first communication channel. The control unit selects a second communication channel and a third communication channel. The second and the third communication channels are different from the first communication channel. The transmission and reception unit transmits an instruction frame to the wireless communication terminal when the monitoring unit detects the interference signal in the first communication channel. The instruction frame includes information on the second and third communication channels and instructs the wireless communication terminal to switch the communication channel from the first communication channel to at least one of the second and third communication channels.

18 Claims, 22 Drawing Sheets

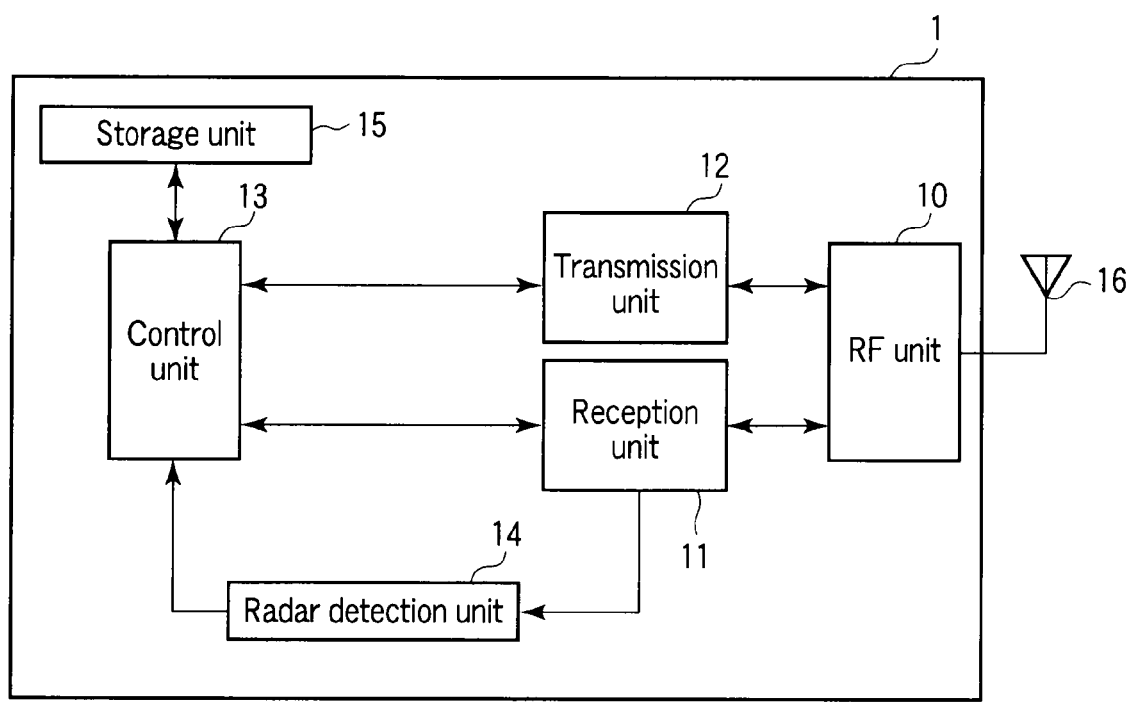
F I G. 3

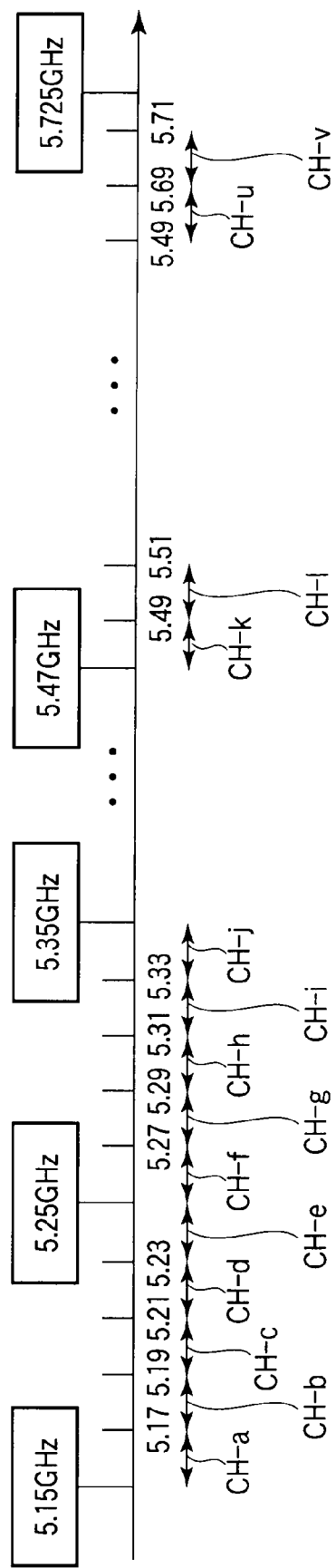
F I G. 4

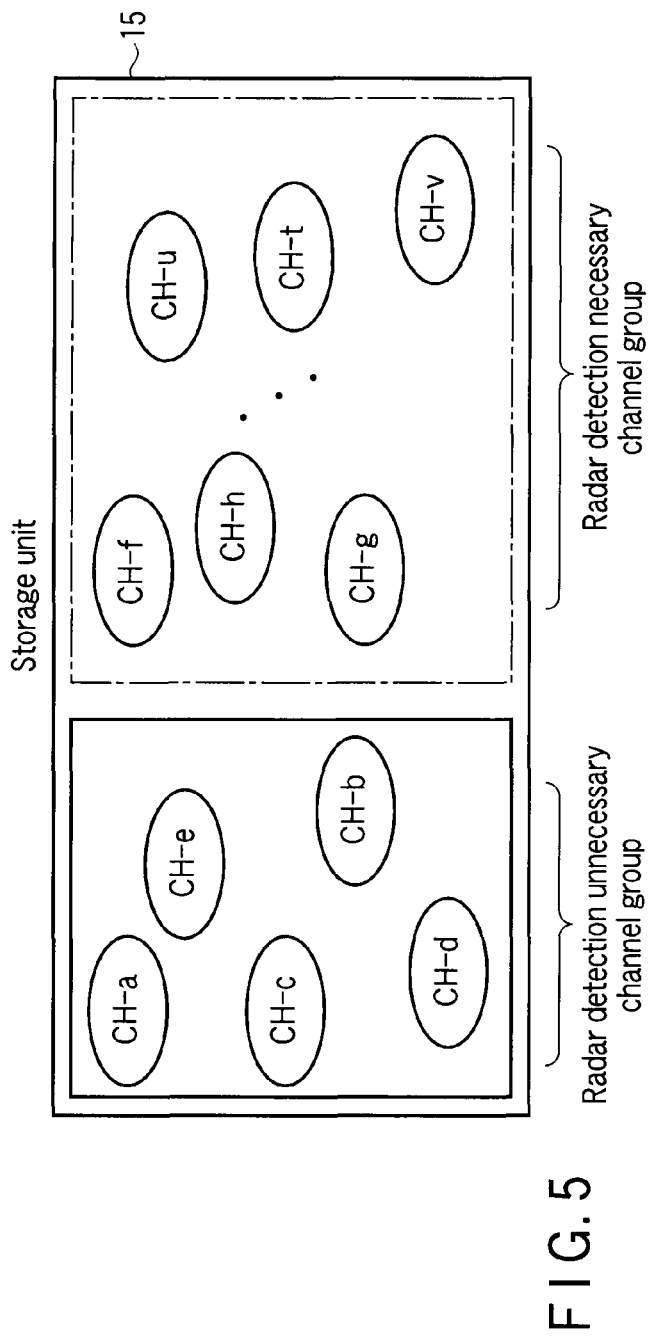
F I G. 5
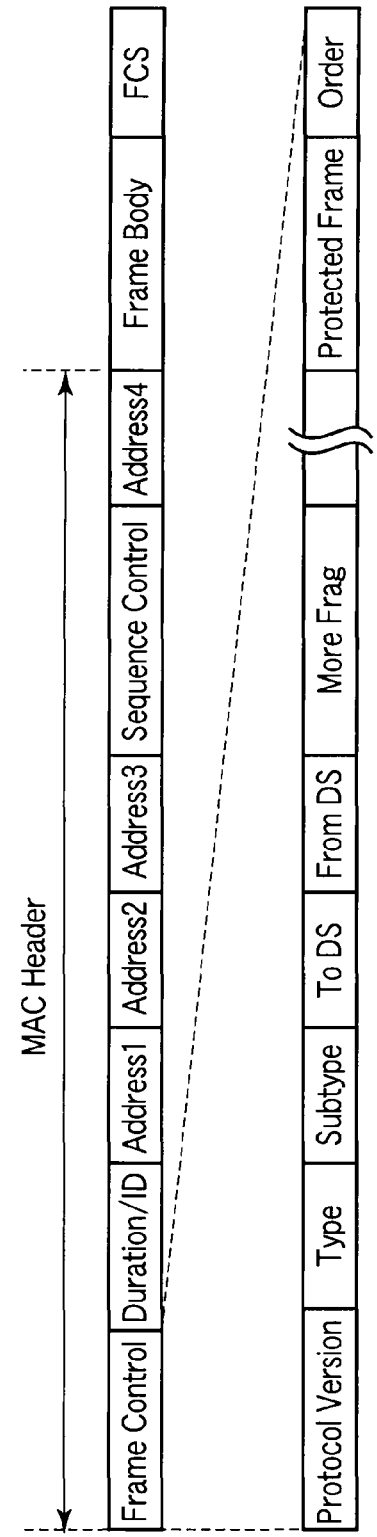
F I G. 6

| Newly defined class | Start frequency fs [GHz] | Channel width Wch [MHz] | Channel number | Operation definition |
|---|---|---|---|---|
| 1 | 5 | 20 | 36, 40, 44, 48 | 1, 2 |
| 2 | 5 | 20 | 52, 56, 60, 64 | 1 |
| 22 | 5 | 40 | 36, 44 | 1, 2, 13 |
| 23 | 5 | 40 | 52, 60 | 1, 13 |
| 27 | 5 | 40 | 40, 48 | 1, 2, 14 |

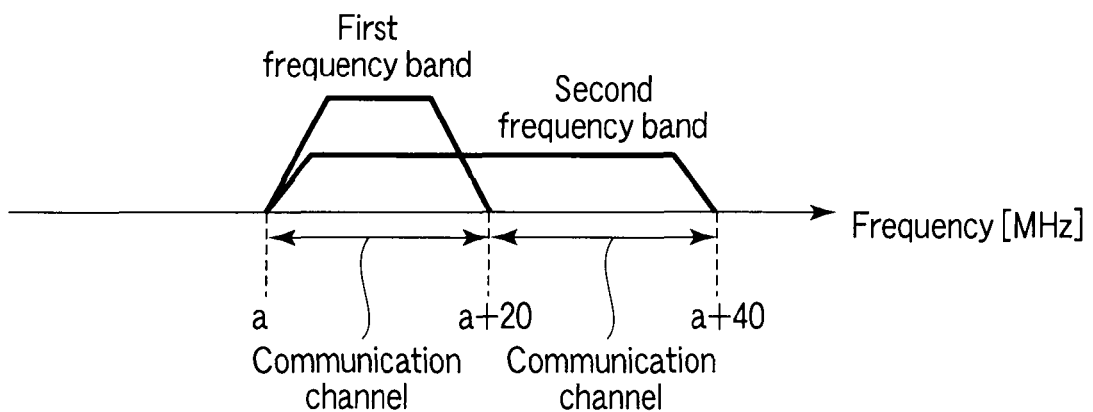
F I G. 17
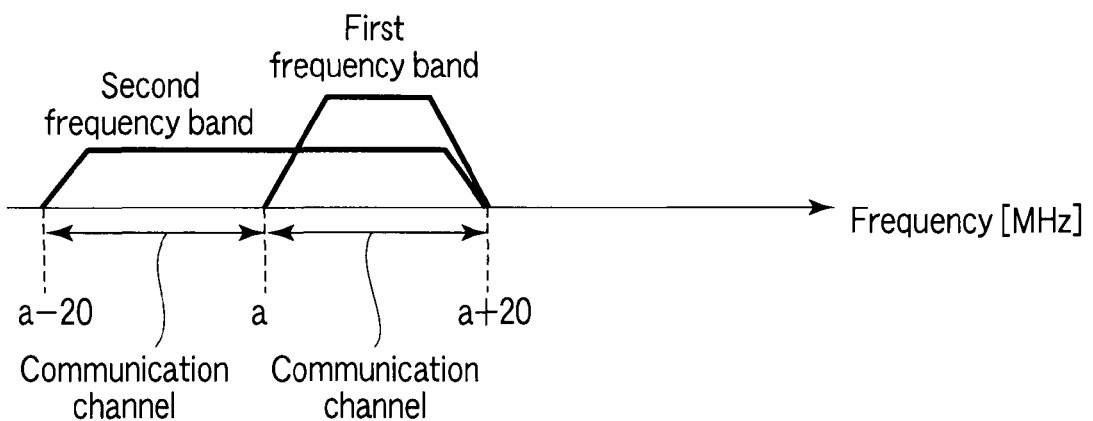
F I G. 18

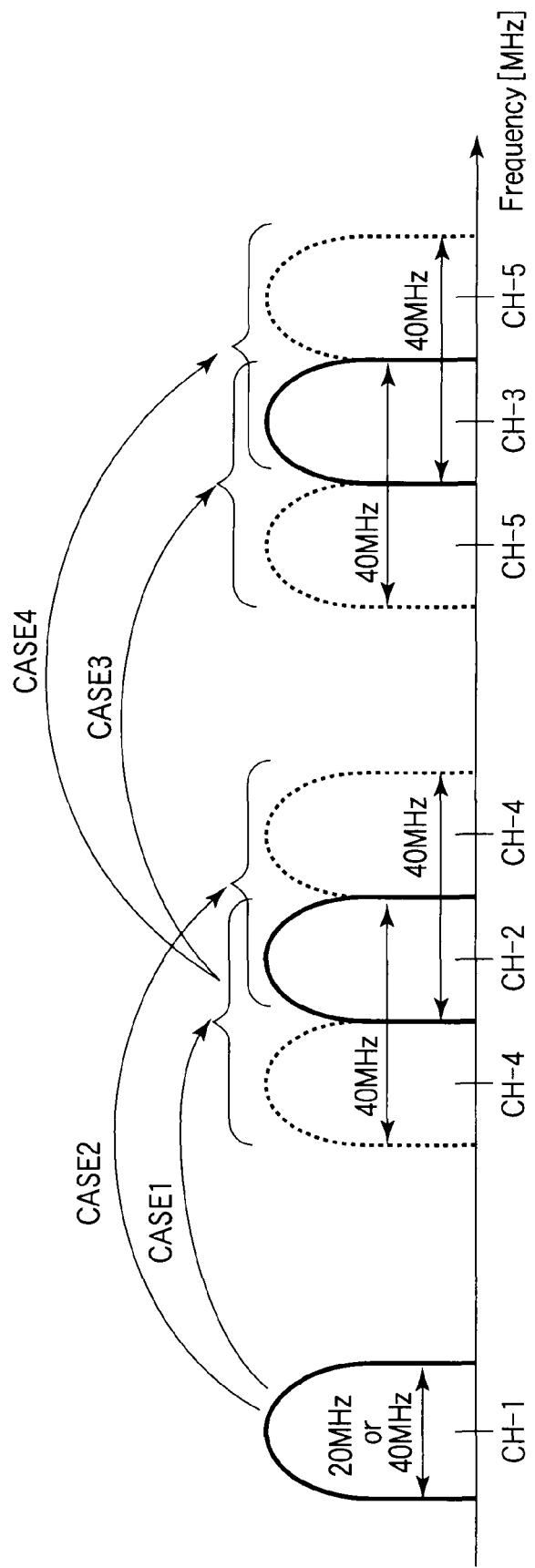
F I G. 19

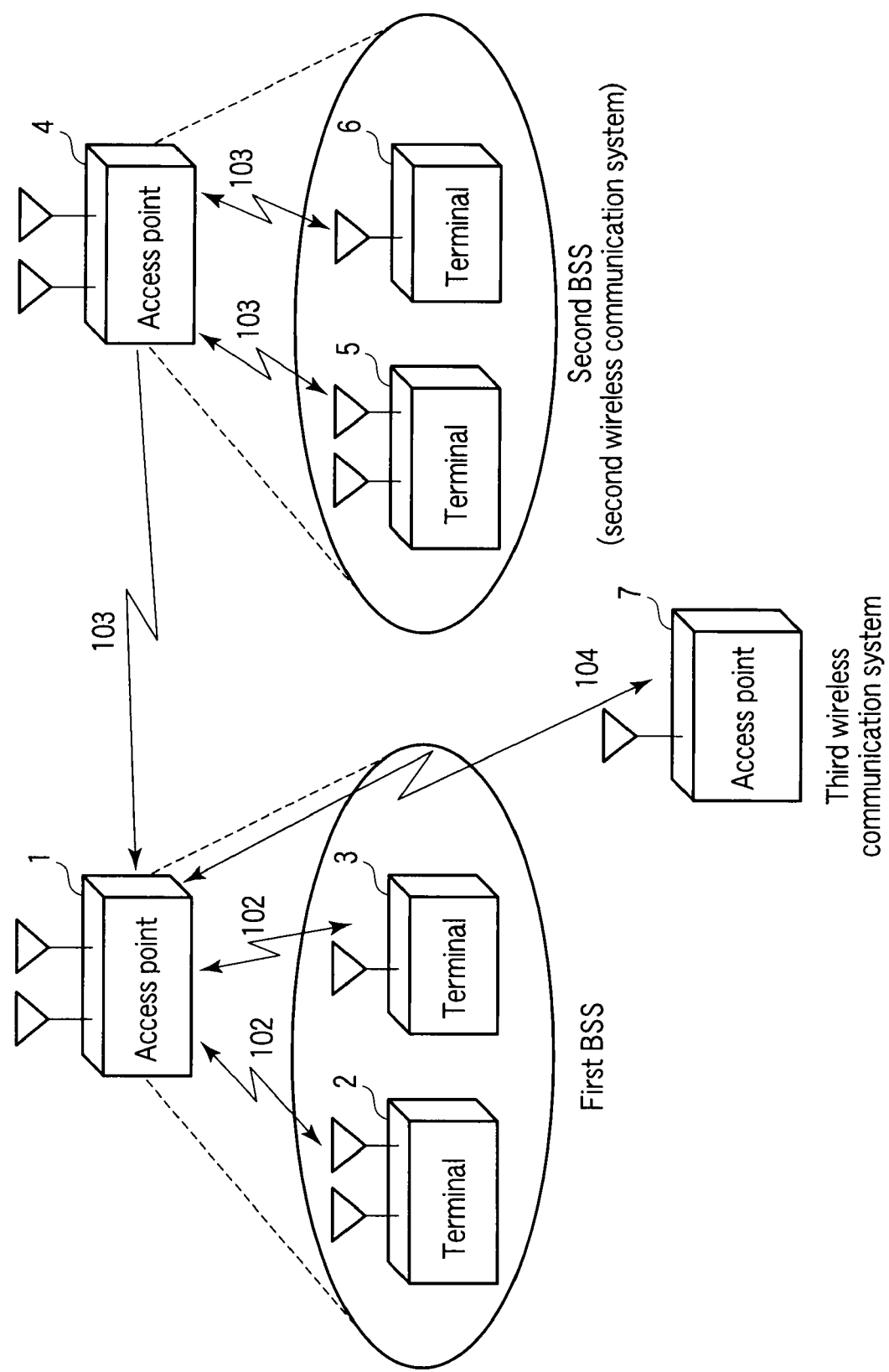
F I G. 23

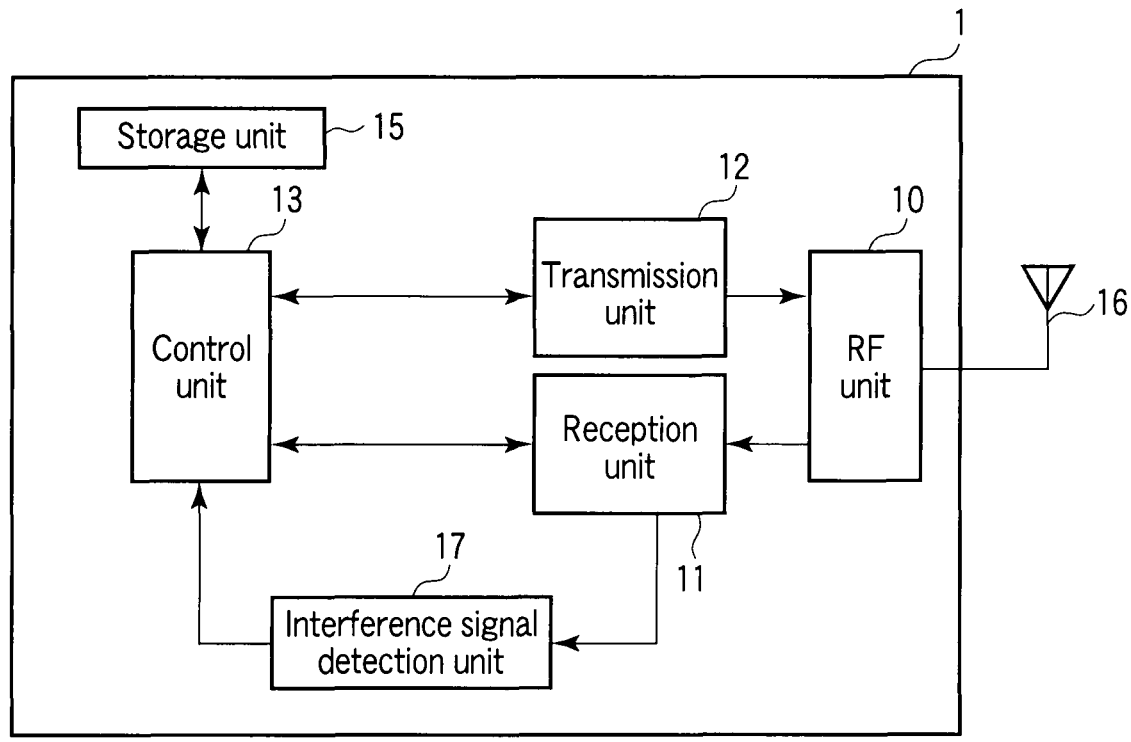
F I G. 24
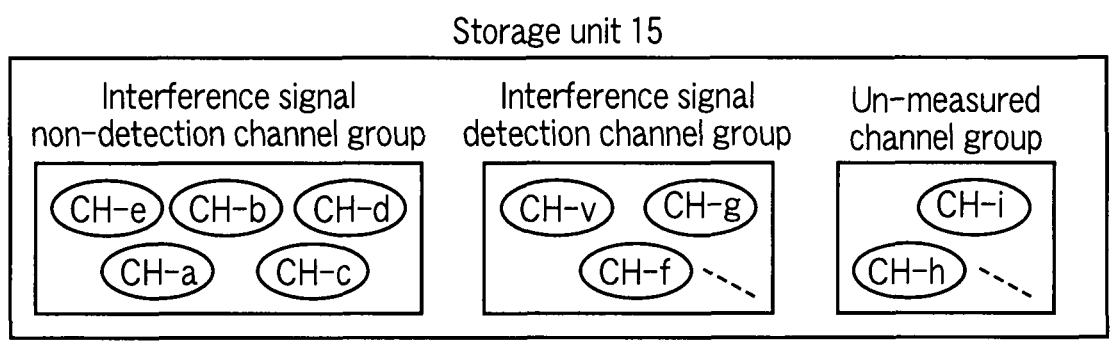
F I G. 25

WIRELESS COMMUNICATION APPARATUS AND WIRELESS COMMUNICATION METHOD ENABLING SWITCHING OF COMMUNICATION CHANNEL

CROSS-REFERENCE TO RELATED APPLICATIONS

This application is based upon and claims the benefit of priority from prior Japanese Patent Application No. 2007-286574, filed Nov. 2, 2007, the entire contents of which are incorporated herein by reference.

BACKGROUND OF THE INVENTION

1. Field of the Invention

The present invention relates to a wireless communication apparatus and a wireless communication method. For example, the invention relates to a method for switching a communication channel in detecting an interference signal.

2. Description of the Related Art

Conventionally, in a wireless LAN system in accordance with the IEEE (Institute of Electrical and Electronics Engineers) 802.11a standard, wireless communication is conducted using a 20-MHz frequency band.

In accordance with Radio Law, when radar is detected in the in-use communication channel, the communication in the communication channel is prohibited for a given period. The related method used is disclosed in Jpn. Pat. Appln. KOKAI Publication No. 2007-005897, for example. Radar here means radar as used by the Meteorological Agency, for example.

Therefore, in the IEEE 802.11h standard, a procedure in which the wireless LAN base station switches the communication channel to another usable communication channel is defined when radar is detected.

In switching the communication channel, the wireless LAN station transmits a channel switching notification frame to all the wireless LAN terminals in order to notify the wireless LAN terminal of a communication channel of a transition destination. Adoption of the above method enables long-time prohibition of wireless communication to be avoided upon detection of radar.

However, in the IEEE 802.11h standard, information of only one communication channel of the transition destination can be set at the channel switching notification frame. Therefore, in the case where radar exists in the communication channel of the transition destination, unfortunately, the communication cannot be conducted in the communication channel of the transition destination.

BRIEF SUMMARY OF THE INVENTION

A wireless communication apparatus which accommodates a wireless communication terminal therein to form a first wireless communication system and communicates with the wireless communication terminal by a first communication method, the wireless communication apparatus according to an aspect of the present invention includes:

a transmission and reception unit which transmits and receives a frame to and from the wireless communication terminal using a communication channel;

a monitoring unit which monitors presence or absence of an interference signal in a first communication channel which is the communication channel currently used by the transmission reception unit, the interference signal being a signal other than a signal used in the communication conducted by the first wireless communication system; and a control unit which selects a second communication channel and a third communication channel, the second and the third communication channels being different from the first communication channel, the transmission and reception unit transmitting an instruction frame to the wireless communication terminal when the monitoring unit detects the interference signal in the first communication channel, the instruction frame including information on the second and third communication channels, the instruction frame instructing the wireless communication terminal to switch the communication channel from the first communication channel to at least one of the second and third communication channels.

A wireless communication method according to an aspect of the present invention includes:

monitoring presence or absence of an interference signal in a first communication channel;

selecting a second communication channel and a third communication channel in place of the first communication channel when the interference signal is detected; and transmitting an instruction frame to instruct to switch from the first communication channel to the second communication channel and to switch from the second communication channel to the third communication channel.

BRIEF DESCRIPTION OF THE SEVERAL VIEWS OF THE DRAWING

FIG. 3 is a block diagram showing an access point according to the first embodiment;

FIG. 4 is a band diagram showing a frequency band usable in the first embodiment;

FIG. 5 is a conceptual diagram showing information stored in a storage unit according to the first embodiment;

FIG. 6 is a conceptual diagram showing a frame configuration according to the first embodiment;

FIGS. 17 and 18 are band diagrams showing a frequency band used by a wireless LAN system according to a second embodiment of the invention;

FIG. 19 is a band diagram showing a frequency band used in the second embodiment;

FIG. 23 is a block diagram showing a wireless LAN system according to a third embodiment of the invention;

FIG. 24 is a block diagram showing an access point according to the third embodiment;

FIG. 25 is a conceptual diagram showing information stored in a storage unit according to the third embodiment;

DETAILED DESCRIPTION OF THE INVENTION

First Embodiment

Figure 1:
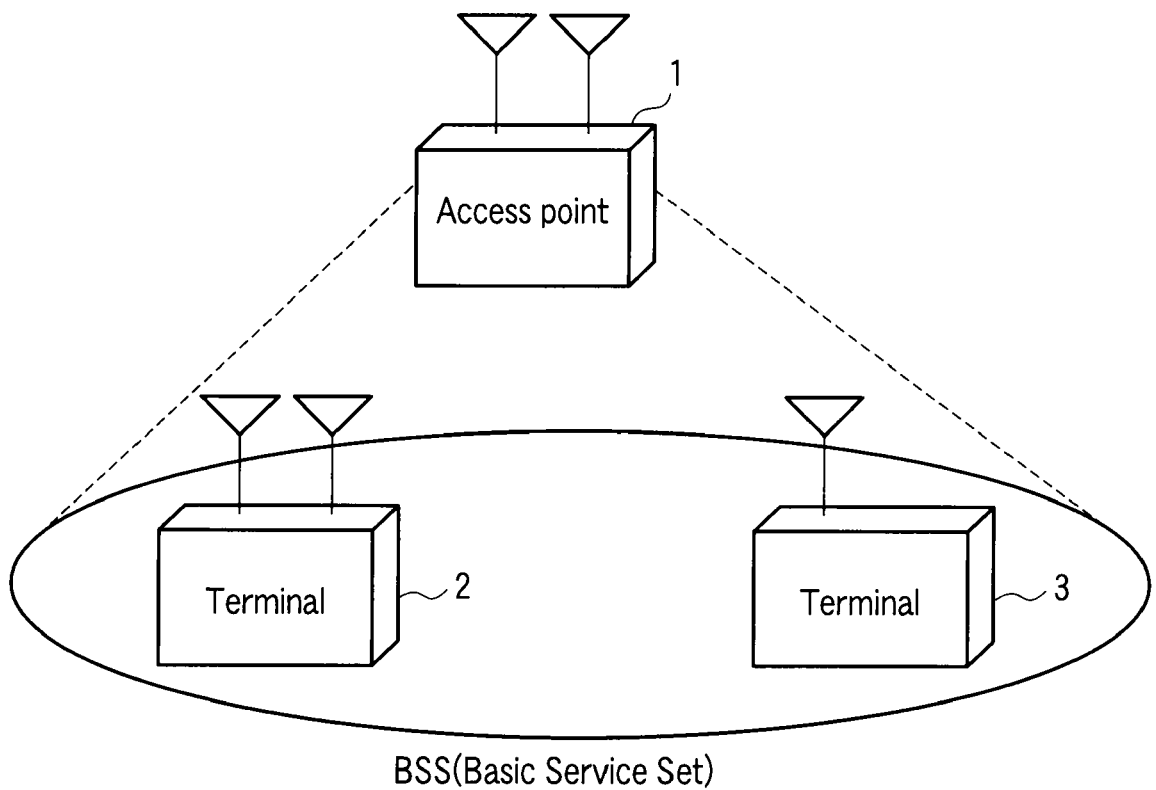
FIG. 1 is a block diagram showing a wireless LAN system according to a first embodiment of the invention.

A wireless communication apparatus and a wireless communication method according to a first embodiment of the invention will be described below with reference to FIG. 1. FIG. 1 is a conceptual diagram showing a wireless LAN system according to the first embodiment, and FIG. 1 shows a wireless LAN system in accordance with the IEEE 802.11a standard.

Referring to FIG. 1, the wireless LAN system according to the first embodiment includes a wireless communication base station (hereinafter referred to as access point) 1 and wireless communication terminals (hereinafter referred to as terminal) 2 and 3, and wireless communication is conducted among the access point 1 and the terminal 2 and 3. A unit consisting of the access point 1 and at least one terminal is referred to as a BSS (Basic Service Set) in the IEEE 802.11 standard. That is, the access point 1 accommodates plural terminals 2 and 3 therein, and the access point 1 forms the communication system (BSS) in which communication can be conducted with the terminals 2 and 3 by a wireless LAN method. In FIG. 1, the two terminals are included in a BSS. However, there is no particular limitation to the number of terminals.

In the first embodiment, each of the access point 1 and the terminal 2 has two antennas, and the terminal 3 has one antenna. Alternatively, in a BSS, the access point 1 may have plural antennas, and each of the terminals 2 and 3 may have a single antenna. One or plural antennas may be amounted on the access point 1 or the terminals 2 and 3 according to the communication method in the wireless LAN system.

Figure 2:
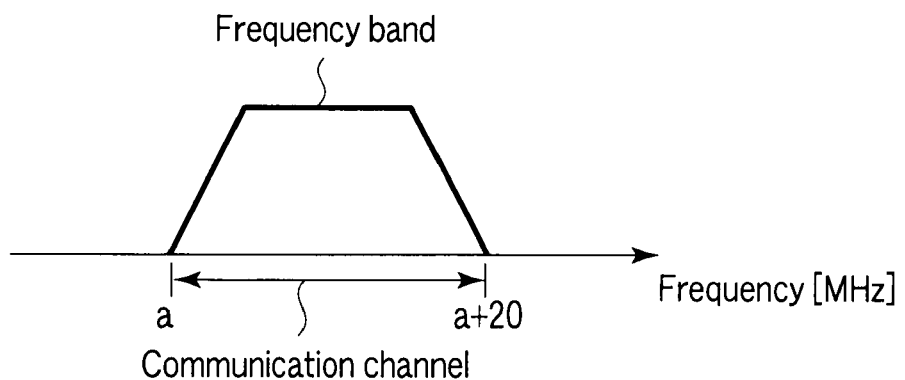
FIG. 2 is a band diagram showing a frequency band used in the first embodiment.

FIG. 2 is a band diagram showing a frequency band used in the wireless LAN system according to the first embodiment. Referring to FIG. 1, the wireless LAN system of the first embodiment conducts communication using a frequency band having a 20-MHz bandwidth of a MHz to (a+20) MHz. Hereinafter, a unit of the 20-MHz frequency band is referred to as a communication channel.

(Configuration of Access Point 1)

An internal configuration of the access point 1 will be described with reference to FIG. 3. FIG. 3 is a block diagram showing the access point 1 of the first embodiment. Referring to FIG. 3, the access point 1 includes an RF unit 10, a reception unit 11, a transmission unit 12, a control unit 13, a radar detection unit 14, a storage unit 15, and an antenna 16.

The antenna 16 receives a radio signal (RF signal: analog signal) transmitted from the terminals 2 and 3, and the antenna 16 transmits the radio signal to the terminals 2 and 3.

In receiving the radio signal, the RF unit 10 down-converts the 5-GHz-band radio signal (analog signal) received through the antenna 16 and supplies the radio signal to the reception unit 11. In transmitting the radio signal, the RF unit 10 up-converts the analog signal supplied from the transmission unit 12 into the 5-GHz-band radio signal, and the RF unit 10 transmits the radio signal through the antenna 16.

In receiving the radio signal, the reception unit 11 receives the analog signal supplied from the RF unit 10. Then, the reception unit 11 performs A/D conversion on the analog signal to obtain a digital signal. The digital signal is supplied to the radar detection unit 14. The reception unit 11 also performs demodulation processing on the obtained digital signal. The demodulation processing is defined by the wireless LAN system of the IEEE 802.11 (including IEEE 802.11a, IEEE 802.11b, IEEE 802.11g, and IEEE 802.11n) standard. For example, the reception unit 11 performs Orthogonal Frequency Division Multiplexing (OFDM) demodulation and error correction decoding, and the reception unit 11 supplies the obtained frame in the form of a baseband reception signal to control unit 13.

The radar detection unit 14 monitors the presence or absence of radar in the digital signal obtained by the reception unit 11. That is, the radar detection unit 14 detects whether or not radar exists in the communication channel currently used by the access point 1. When detecting radar, the radar detection unit 14 supplies a detection signal to the control unit 13.

The control unit 13 processes transmission and reception data, and the control unit 13 controls the communication channel used by the reception unit 11 and transmission unit 12. More specifically, the control unit 13 performs baseband processing on the transmission and reception data. In receiving the radio signal, the control unit 13 assembles a packet by removing a MAC (Media Access Control) header from a baseband reception signal supplied from the reception unit 11. A packet means transmission and reception data which is assembled into a data structure which can be handled by a personal computer. On the other hand, in transmitting a radio signal, the control unit 13 assembles a frame by adding the MAC header to data which should be transmitted to the terminals 2 and 3. A frame means transmission and reception data, which is assembled such that wireless communication can be conducted. The control unit 13 supplies the obtained frame in the form of a baseband transmission signal to the transmission unit 12. The MAC header and frame are described in detail later.

The control unit 13 issues a command to monitor radar to the radar detection unit 14. The control unit 13 generates a channel switching notification frame to supply the channel switching notification frame to the transmission unit 12 when receiving the detection signal from the radar detection unit 14, and the control unit 13 issues a command to stop the data transmission to the transmission unit 12 after transmitting the channel switching notification frame. Then, the control unit 13 issues a command to switch the communication channel to be used to the reception unit 11 and the transmission unit 12. A channel switching notification frame means a frame which is used to command the terminals 2 and 3 to switch the communication channel. The channel switching notification frame includes information on the communication channel which is a transition destination. Details of the channel switching notification frame are given later. Hereinafter, the channel switching notification frame is simply referred to as a switching frame.

The transmission unit 12 performs modulation processing on the baseband transmission signal supplied from the control unit 13. The modulation processing is defined by the IEEE 802.11 (including IEEE 802.11a, IEEE 802.11b, IEEE 802.11g, and IEEE 802.11n) standard. That is, the transmission unit 12 performs OFDM modulation and error correction coding on the baseband transmission signal, and the transmission unit 12 performs D/A conversion on the obtained modulation signal to obtain the analog signal. The transmission unit 12 supplies the analog signal to the RF unit 10, and the transmission unit 12 performs data transmission on the terminals 2 and 3 in a broadcast, multicast, or uni-cast fashion.

The information on the plural communication channels in the frequency band usable in the wireless LAN system is stored in the storage unit 15. Plural communication channels are usable in the wireless LAN system in accordance with the IEEE 802.11 standard, and the control unit 13 selects the communication channel to be used from the plural communication channels whose pieces of information are stored in the storage unit 15.

(Communication Channel)

FIG. 4 is a band diagram showing a frequency band used in the wireless LAN system according to the first embodiment. Referring to FIG. 4, the usable frequency band includes a band of 5.15 GHz to 5.35 GHz and a band of 5.47 GHz to 5.725 GHz. In the frequency bands, because the communication channel in the band of 5.15 GHz to 5.25 GHz is usually used only indoors, it is not necessary to monitor for radar. On the other hand, the communication channel in the band of 5.25 GHz to 5.35 GHz and the communication channel in the band of 5.47 GHz to 5.725 GHz can be used outdoors because of the large transmission power needed. Accordingly, in the case where communication is conducted using a communication channel in the bands of 5.25 GHz to 5.35 GHz and 5.47 GHz to 5.725 GHz, because of the possibly of radar interference, it is necessary for the radar detection unit 14 to monitor for radar. In a communication channel in the bands of 5.25 GHz to 5.35 GHz and 5.47 GHz to 5.725 GHz, communication can be conducted only in the case where radar does not exist.

Each communication channel has a bandwidth of 20 MHz, as described in FIG. 2. Accordingly, 10 communication channels are usable in the range of 5.15 GHz to 5.35 GHz. The communication channels are the bands of 5.15 GHz to 5.17 GHz, the band of 5.17 GHz to 5.19 GHz, . . . , and the band of 5.33 to 5.35 GHz. Hereinafter, these bands may be referred to as communication channels CH-a to CH-j in some cases. 12 communication channels are usable in the range of 5.47 GHz to 5.725 GHz. The communication channels are the bands of 5.47 GHz to 5.49 GHz, the band of 5.49 GHz to 5.51 GHz, . . . , and the band of 5.69 GHz to 5.71 GHz. Hereinafter, these bands may be referred to as communication channels CH-k to CH-v in some cases. That is, radar monitoring is not required for use of the communication channels CH-a to CH-e, while radar monitoring is required for use of the communication channels CH-f to CH-v.

The information on all or some of the communication channels CH-a to CH-v are stored in the storage unit 15. This information means information which is necessary when the control unit 13 performs the control for switching the communication channel in use. FIG. 5 is schematic diagram showing information stored in the storage unit 15.

Referring to FIG. 5, the storage unit 15 manages the communication channels CH-a to CH-e as a radar detection unnecessary channel group, and the storage unit 15 manages the communication channels CH-f to CH-v as a radar detection necessary channel group. Accordingly, the control unit 13 refers to the storage unit 15 to obtain the necessary/unnecessary information on the radar monitoring for each communication channel.

(Frame Configuration)

The frame transmitted and received between the access point 1 and the terminals 2 and 3 in the wireless LAN system according to the first embodiment will be described below with reference to FIG. 6. FIG. 6 is a conceptual diagram showing a frame configuration.

Referring to FIG. 6, the frame includes a MAC header, a frame body, and FCS (Frame Check Sequence). The MAC header is information which is necessary for MAC layer reception processing. The frame body is net data which should be transmitted to the destination.

FCS is a CRC (Cyclic Redundancy Code), which is used to determine whether or not the MAC header and the frame body are normally received.

The MAC header will be described in detail. The MAC header includes a frame control field, a duration/ID field, at least one address field (address 1 to address 4 are shown as the address field in FIG. 6), and a sequence control field.

A value is set at the frame control field according to the type of frame. A transmission waiting duration (NAV: network allocation vector) is set at the duration/ID field. A direct destination or a final destination of the data or an MAC address of a source is set at the address field. A sequence number of transmission data or a fragment number in the case where data is fragmented is set at the sequence control field.

The sequence control field includes a protocol version, a type field, a subtype field, a "To DS" field, a "From DS" field, a more fragment field, a protected frame field, and an order field.

Information indicating the type of frame is set at the type field and the subtype field. The data destination can determine whether the frame is a control frame, a management frame, or a data frame based on bit information set at the type field. The switching frame is transmitted as the management frame. The type of frame is determined by the bit information on the subtype field. Examples of the type of management frame include a beacon frame, an association frame, and an action frame.

When the terminal finds a new access point, the association frame is used to provide a notification of participation in BSS formed by the access point. The action frame is used to provide a notification that a direct link is established between the terminals. The beacon frame is periodically (for example, every 100 ms) transmitted from the access point 1 to the terminal 2 and 3.

Information indicating whether the communication is conducted through the access point 1 of FIG. 1 is stored in the "To DS" field and the "From DS" field. Usually the access point 1 exchanges data with another access point (not shown) while a wired LAN network (not shown) is used as a backbone. The network connecting the access point 1 and the access point (not shown) is referred to as a DS (distribution system). The DS indicates whether or not the terminals 2 and 3 exchange the data with another access point (not shown) through the access point 1.

The more fragment field retains information indicating whether or not a subsequent fragment frame exists when the data is fragmented. Information indicating whether or not the frame is protected is set at the protect frame field. The order field indicates that interchange of the frame order is prohibited in relaying the frame.

Figure 7:
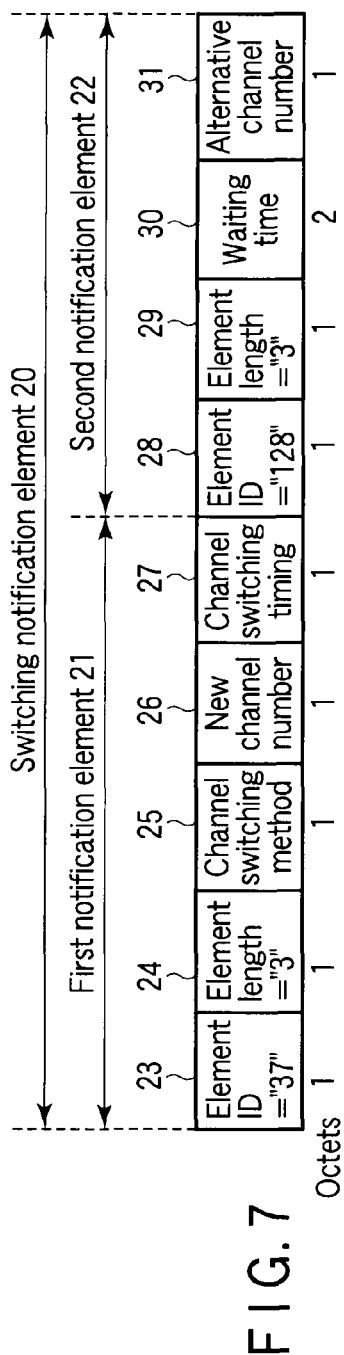
FIGS. 7 to 9 are conceptual diagrams showing a switching notification element according to the first embodiment.
Figure 8:
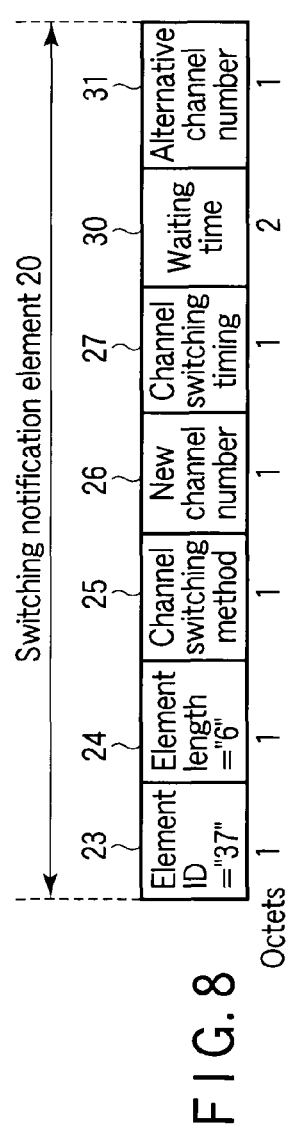
Figure 9:
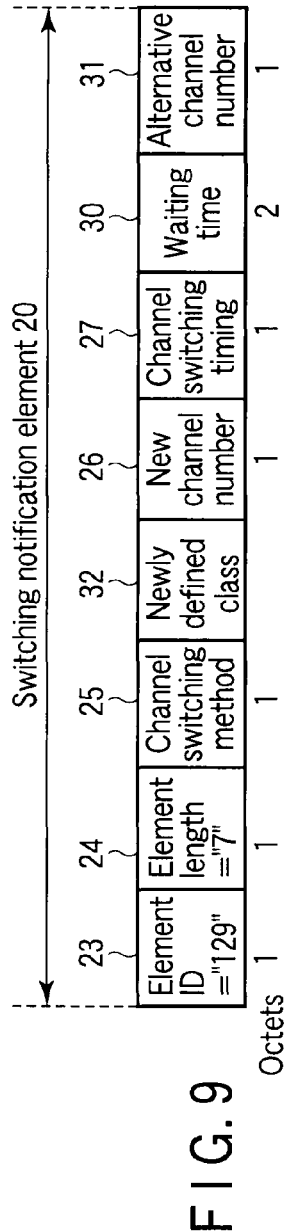

Next, a switching frame produced by the access point 1 will be described below. The switching frame is transmitted as the beacon frame, and a switching notification element is set at a frame body of the switching frame. Information on at least two communication channels which is the transition destinations from the communication channel in current use are set at the channel switching element. The number of set communication channels is not limited to two, and three or four communication channels may be set as long as plural communication channels are set. The switching notification element will be described below with reference to FIGS. 7 to 9. FIGS. 7 to 9 are schematic diagrams showing configuration examples of the switching notification element.

(First Format Example of Channel Switching Element)

A first format example of the channel switching element will be described with reference to FIG. 7.

Referring to FIG. 7, the channel switching element includes a first notification element 21 and a second notification element 22. The first notification element 21 has the information on one of the two communication channels which is the transition destinations, and the second notification element 22 has the information on the other communication channel. The first notification element 21 includes an element ID 23, an element length 24, a channel switching method 25, a new channel number 26, and a channel switching timing 27. Each of the pieces of information is 8-bit (1-octet) information.

The element ID 23 is disposed at a leading end of the first notification element 21. The frame destination receives the element ID 23 to recognize that the subsequent pieces of data are the first notification element 21. Accordingly, plural mutually independent values, which can be used as the element ID 23, are previously defined in the IEEE 802.11 standard. That is, the element ID 23 is distinguished from other elements by the use of the independent value. In the example of FIG. 7, the element ID 23 has a value of "37".

A length of the first notification element 21 in which the lengths of the element ID 23 and element length 24 are removed is set at the element length 24 in octet units. Accordingly, in the example of FIG. 7, the value of "3" is set at the element length 24.

A restriction on a transmission operation until the terminals 2 and 3 start the switching of the communication channel is set at the channel switching method 25. For example, in the case where "0" is set at the channel switching method 25, the terminals 2 and 3 are not subject to a particular restriction. On the other hand, in the case where "1" is set at the channel switching method 25, the terminals 2 and 3 are prohibited to perform transmission until the communication channels are switched.

A number allocated to the communication channel newly used are set at the new channel number 26. The communication channel corresponding to the new channel number 26 is selected from the radar detection necessary channel group in the storage unit 15 by the control unit 13. That is, the communication channel corresponding to the new channel number 26 is either of the communication channels CH-f to CH-v.

The timing at which the communication channel in current use is switched to the communication channel corresponding to the new channel number 26 is set at the channel switching timing 27. The timing is defined by the number of beacon frame reception times. That is, the beacon frame is periodically transmitted by the access point 1. In setting "n (n is a natural number)" at the channel switching timing 27, an agreement is made such that the communication channel is concurrently switched to the communication channel corresponding to the new channel number 26 when the terminals 2 and 3 receive the beacon frame n-th time after receiving the switching frame.

Obviously, the switching timing method is not limited to the above-described method, and various methods can be adopted. For example, "the number of times in which time (hereinafter referred to as TBTT) the access point 1 transmits the beacon frame elapses" may be set at the channel switching timing 27. That is, the method can be adopted when the access point 1 and the terminals 2 and 3 have timepieces or counters in which the access point 1 and the terminals 2 and 3 are mutually synchronized with each other. In the case where "n" is set at the channel switching timing 27, the communication channels are switched at the n-th time TBTT timing. Because the access point 1 transmits (broadcasts) the beacon frame to the terminals 2 and 3 at predetermined intervals, even if the terminals 2 and 3 do not actually receive the beacon frame, the terminals 2 and 3 can recognize the TBTT at which the beacon frame should be received.

The second notification element 22 will be described below. The second notification element 22 includes an element ID 28, an element length 29, a waiting time 30, and an alternative channel number 31. The waiting time 30 is 16-bit (2-octets) information, and other information are 8 bits.

Similarly to the element ID 23, the element ID 28 retains a value indicating that the data is the second notification element 22. For example, the element ID 28 retains the value of "128".

Similarly to the element length 24, the element length 29 retains a length in which the lengths of the element ID 28 and element length 29 are removed in octet units.

In the example of FIG. 7, "3" is set at the element length 29.

A number of the communication channel newly used is set at the alternative channel number 31. The communication channel corresponding to the alternative channel number 31 is selected from the radar detection unnecessary channel group in the storage unit 15 by the control unit 13. That is, the communication channel corresponding to the alternative channel number 31 is one of the communication channels CH-a to CH-e. The communication channel corresponding to the alternative channel number 31 differs from the communication channel corresponding to the new channel number 26. The communication channel corresponding to the alternative channel number 31 is used when the communication channel corresponding to the new channel number 26 cannot be used.

The waiting time 30 is a time the terminals 2 and 3 wait to receive the frame from the access point 1 which makes the transition to the communication channel corresponding to the new channel number 26. The measurement of the waiting time 30 is started immediately after the timing becomes the channel switching timing 27. In the case of the agreement in which a previously defined fixed time is set at the waiting time 30, it is not always necessary that the waiting time 30 be included in the second notification element 22.

(Second Format Example of Channel Switching Element)

A second format example will be described below with reference to FIG. 8. Referring to FIG. 8, in the channel notification element 20, the element ID 28 and the element length 29 of the configuration of FIG. 7 are eliminated.

The value of the element ID 23 may be equal to the value of FIG. 7, that is, the Channel Switch Announcement element of "37" defined by the IEEE 802.11h standard, or the value of the element ID 23 may be another new value. That is, the element ID 23 may have the value, which can make the notification that the subsequent pieces of data are the switching notification element 20.

However, in the case where a new value is used as the element ID 23, the terminal which can recognize only the current switching notification element cannot recognize the element 20 having the second format example. In such cases, it is necessary that the terminal be notified of the new element ID 23. Even if "37" is used as the element ID, the terminal which can recognize only the current switching notification element cannot recognize only the element ID 23, the element length 24, the channel switching method 25, the new channel number 26, and the channel switching timing 27. In such cases, the agreement that the second format example is used may previously be performed, or notification that the second format example is used may be made in the channel switching method 25. That is, the agreement may be made such that the case in which "i (i is a natural number)" is set at the channel switching method 25 means that the waiting time 30 and the alternative channel number 31 are added to the first notification element 21 shown in FIG. 7.

The length of the switching notification element 20 in which the lengths of the element ID 23 and element length 24 are removed is set at the element length 24 in octet units. In the example of FIG. 8, "6" is set at the element length 24. Other elements are identical those described in FIG. 7.

(Third Format Example of Channel Switching Element)

A third format example will be described below with reference to FIG. 9. Referring to FIG. 9, the channel notification element 20 further includes a newly defined class in the configuration described in FIG. 8. Because other configurations are similar to those of FIG. 8, the description is omitted. "129" is set at the element ID 23, or another value may be set at the element ID 23 as long as the value is not equal to those of other elements ID.

A number of a defined class of the communication channel, which is the transition destination, is set at a newly defined class 32. The detailed setting of the communication method can be made by setting the defined class. The newly defined class 32 will be described with reference to FIG. 10.

Figures 10, 11:
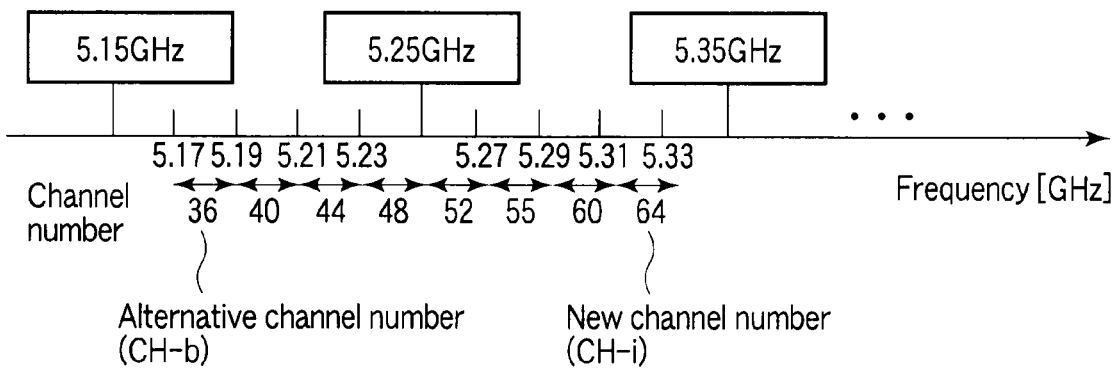
FIG. 10 is a table showing a newly defined class according to the first embodiment.
FIG. 11 shows a relationship between a frequency band and a channel number which can be used in the first embodiment.

FIG. 10 is a table showing the concept of the defined class. Referring to FIG. 10, five numbered classes are set as the defined class, and "1", "2", "22", "23", and "27" are set at the numbers CN (Class Number). One of the numbers CN is set as the newly defined class 32. A start frequency fs (GHz), a channel width Wch (MHz), a channel number, and an operation definition are defined in each class.

The start frequency fs is the lowest frequency in the frequency band which can be used as the communication channel. The start frequency fs is 5 GHz in the example of FIG. 10.

The channel width Wch indicates a bandwidth of each communication channel. In the example of FIG. 10, the channel width Wch is 20 MHz for CN="1" and "2", and the channel width Wch is 40 MHz for CN="22", "23", and "27". In other words, two communication channels adjacent to each other are used as one communication channel in CN="22", "23", and "27". The channel number is allocated to each communication channel, and the channel number is also used as the new channel number 26 or the alternative channel number 31. The channel number corresponds to the frequency band used in each communication channel. The channel number is described later. An operation restriction in each defined class is defined in the operation definition. For example, mobile communication can be conducted in the operation definition of "1", and the communication is limited indoors in the operation definition of "2".

The channel number will be described with reference to FIG. 11. FIG. 11 shows a relationship between the frequency band and the communication channel. As described above, the usable communication channels include the five communication channels in the band of 5.15 GHz to 5.25 GHz, the five communication channels in the band of 5.25 GHz to 5.35 GHz, and the 12 communication channels in the band of 5.47 GHz to 5.725. A channel number is given to each communication channel. As shown in FIG. 11, the channel number of "36" is given to the communication channel of 5.17 GHz to 5.19 GHz, the channel number of "40" is given to the communication channel of 5.19 GHz to 5.21 GHz, . . . , the channel number of "48" is given to the communication channel of 5.23 GHz to 5.25 GHz, the channel number of "52" is given to the communication channel of 5.25 GHz to 5.27 GHz, . . . , and the channel number of "68" is given to the communication channel of 5.33 GHz to 5.35 GHz.

The channel number of the usable communication channel is allocated to each defined class. For example, the channel numbers of "36", "40", "44", and "48" are allocated in CN="1", and the channel numbers of "52", "56", "60", and "64" are allocated in CN="2". The following relationship holds between a center frequency of the communication channel and the channel number allocated to the communication channel:

center frequency $fc$ (MHz)=start frequency $fs$ (MHz)+ (channel number×5)

In the case where "1" is selected as the newly defined class 32, the start frequency fs is 5 (GHz), the channel width Wch is 20 (MHz), the channel numbers of the usable communication channel are "36", "40", "44", and "48", and the communication can be conducted indoors or outdoors. The new channel number 26 and the alternative channel number 31 are necessarily selected from "36", "40", "44", and "48". When the new channel number 26 is "36", the center frequency fc becomes as follows:

$fc$=5000+(36×5)=5180 (MHz)=5.18 (GHz)

That is, it is seen that the communication channel CH-b having a center frequency fc of 5.18 (GHz) and a bandwidth of 20 (MHz) corresponds to the new channel number 26.

In the wireless LAN system of the first embodiment, only CN="1" and "2" is used as the defined class in order to conduct wireless communication in which the bandwidth of 20 (MHz) is used.

(Configurations of Wireless Communication Terminals 2 and 3)

Figure 12:
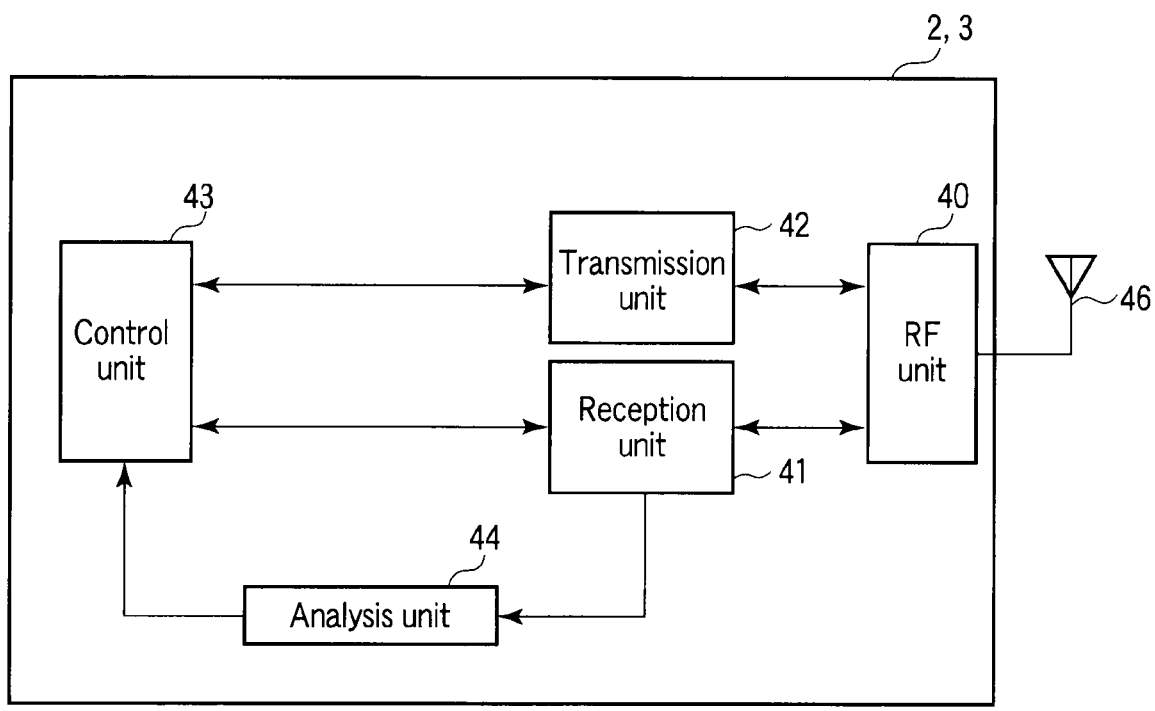
FIG. 12 is a block diagram showing a terminal according to the first embodiment.

Configurations of the terminals 2 and 3 will be described below with reference to FIG. 12. FIG. 12 is a block diagram showing the terminals 2 and 3.

Referring to FIG. 12, the terminals 2 and 3 include an RF unit 40, a reception unit 41, a transmission unit 42, a control unit 43, an analysis unit 44, and an antenna 46.

The RF unit 40, the reception unit 41, the transmission unit 42, and the antenna 46 are similar to the RF unit 10, the reception unit 11, the transmission unit 12, and the antenna 16 of the access point 1, so that the description is omitted. The control unit 43 and the analysis unit 44 will be described below.

The analysis unit 44 analyzes the frame received by the reception unit 41. The analysis unit 44 analyzes the MAC header, and the analysis unit 44 extracts the data included in the frame body and supplies the data to the control unit 43 when the terminals 2 and 3 are the destination of the value set at the address field. The analysis unit 44 discards the data when the terminals 2 and 3 are not the destination of the value set at the address field. When the frame is a switching frame, the analysis unit 44 extracts the switching notification element 20 (see FIGS. 7 to 9) included in the frame body and supplies the switching notification element 20 to the control unit 43.

The control unit 43 issues a command to switch the communication channel in current use to the communication channel specified at the specified timing to the reception unit 41 and the transmission unit 42 based on the switching notification element 20 supplied from the analysis unit 44. The control unit 43 produces a delivery confirmation frame for confirming the delivery relating to the frame, and the control unit 43 supplies the transmission acknowledge frame to the transmission unit 42.

(Channel Switching Operation in Access Point 1)

Figure 13A:
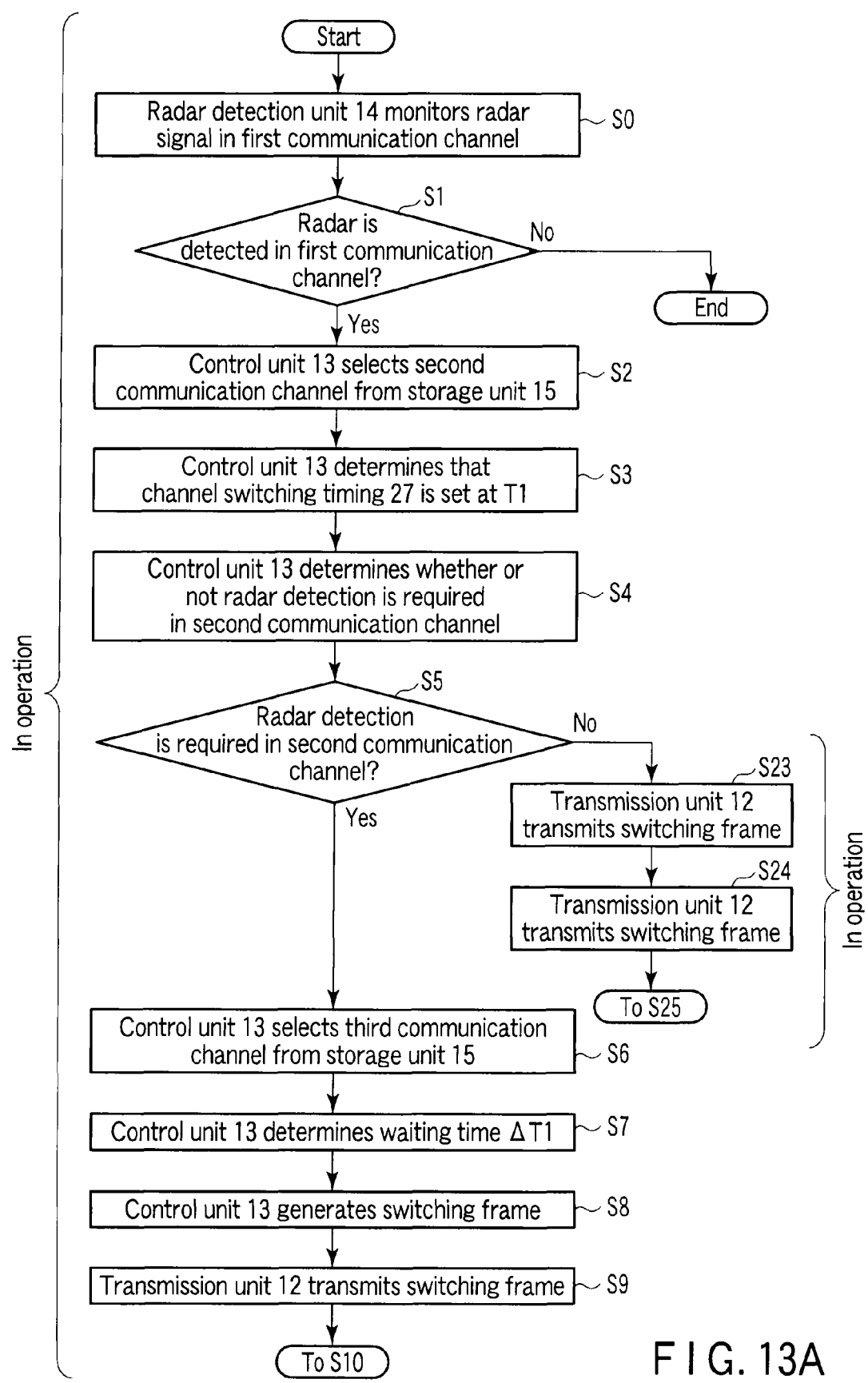
FIGS. 13A, 13B and 14 are flowcharts showing an operation of the access point according to the first embodiment.
Figure 13B:
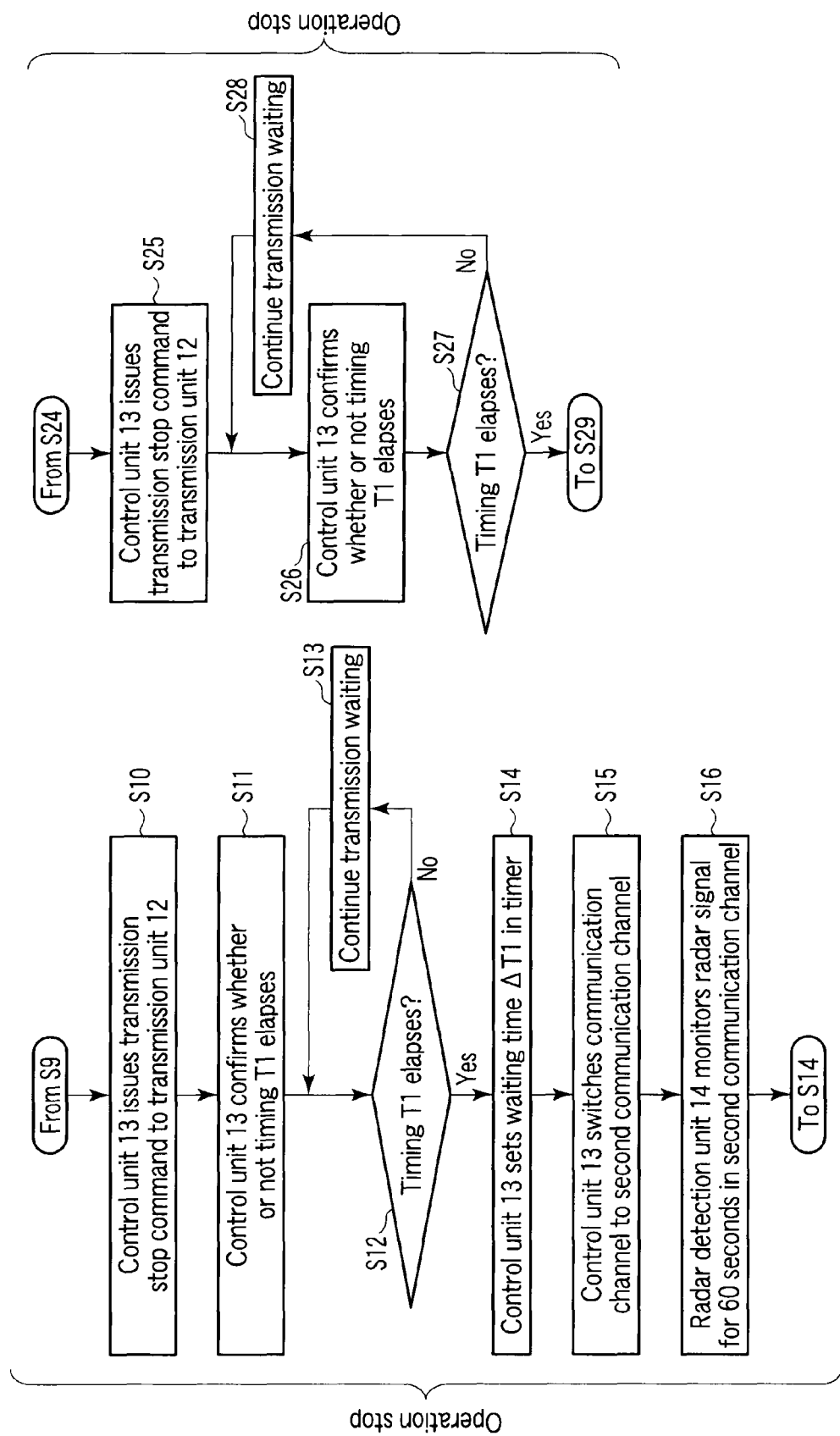
Figure 14:
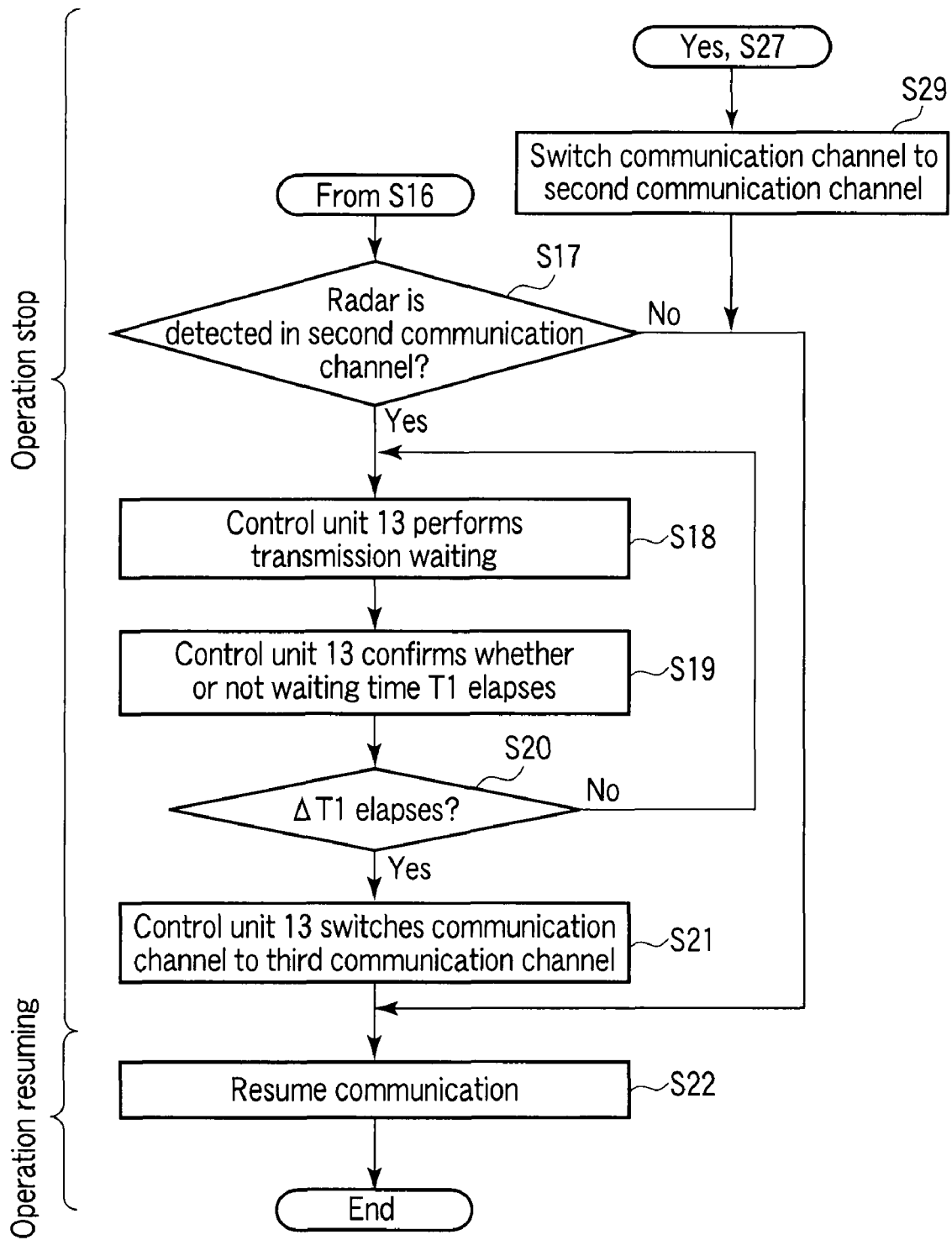

An operation of the access point 1 will be described with reference to FIGS. 13A, 13B and 14 while attention focuses on a switching operation of the communication channel. FIGS. 13A, 13B and 14 are flowcharts showing the operation of the access point 1. The case in which the switching notification element 20 having the configuration of FIG. 7 is used will be described below.

It is assumed that the access point 1 conducts communication using one of the communication channels CH-f to CH-v shown in FIG. 5. Hereinafter, the communication channel used in the access point 1 is referred to as first communication channel CH-1. The radar detection unit 14 monitors the presence or absence of radar in the first communication channel CH-1 (Step S0 of FIG. 13A).

When the radar detection unit 14 detects radar (YES in Step S1), the communication using the first communication channel CH-1 is prohibited. Therefore, the control unit 13 randomly selects another communication channel to which the transition should be made from the first communication channel from the storage unit 15 (Step S2). Hereinafter, the communication channel selected in Step S2 is referred to as second communication channel CH-2. The control unit 13 determines the channel switching timing 27 (Step S3). In the following description, it is assumed that "T1" is the channel switching timing 27.

The control unit 13 determines whether or not the radar detection is necessary for the second communication channel CH-2 (Step S4). The determination of the processing in Step S4 can be made based on whether the second communication channel CH-2 selected in Step S2 belongs to the radar detection unnecessary channel group or the radar detection necessary channel group of FIG. 5.

As a result of Step S4, when the radar detection is necessary for the second communication channel CH-2 (YES in Step S5), there is a possibility of existence of radar in the second communication channel. The control unit 13 further selects another communication channel from the communication channels CH-a to CH-e belonging to the radar detection unnecessary channel group (Step S6). Hereinafter, the communication channel selected in Step S6 is referred to as third communication channel CH-3.

The control unit 13 determines the waiting time 30 until the switching operation for the operation to the third communication channel CH-3 is started (Step S7). Hereinafter the waiting time 30 is referred to as "ΔT1". The waiting time 30 indicates a "maximum duration from timing T1 to the transmission waiting in the second communication channel CH-2".

The control unit 13 produces the switching notification element 20, and the control unit 13 produces the switching frame including the element 20 (Step S8). At this point, a number corresponding to the second communication channel CH-2 is set at the new channel number 26 of the element 20, and "T1" is set at the channel switching timing 27. A number corresponding to the third communication channel CH-3 is set at the alternative channel number 31, and "ΔT1" is set at the waiting time 30.

The switching frame produced by the control unit 13 is transmitted from the transmission unit 12 to the terminals 2 and 3 through the antenna 16 (Step S9). Then, the control unit 13 issues a transmission stop command to the transmission unit 12 (Step S10 of FIG. 13B). The transmission unit 12 stops the transmission using the first communication channel CH-1 in response to the transmission stop command.

The control unit 13 continues to confirm whether or not the timing T1 elapses (Step S11). When the timing T1 does not elapse (NO in Step S12), the control unit 13 continues the transmission waiting (Step S13).

When the timing T1 elapses (YES in Step S12), the control unit 13 sets the waiting time "ΔT1" at a timer included in the control unit 13 (Step S14). At the same time, the control unit 13 issues a command to switch the communication channel used by the transmission unit 12 and the reception unit 11 from the first communication channel CH-1 to the second communication channel CH-2 (Step S15).

Then, before the communication in which the second communication channel CH-2 is used, the access point 1 issues a command to monitor radar to the radar detection unit 14 in order to confirm the presence or absence of radar in the second communication channel CH-2. The radar detection unit 14 monitors radar for 60 seconds in response to the radar monitoring command (Step S16).

As a result of Step S16, when radar is detected in the second communication channel CH-2 (YES in Step S17 of FIG. 14), the wireless communication using the second communication channel CH-2 is prohibited. The control unit 13 issues a transmission waiting command to the transmission unit 12 (Step S18). The control unit 13 confirms whether or not waiting time "ΔT1" set in the timer elapses (Step S19). When the waiting time "ΔT1" does not elapse (NO in Step S20), the control unit 13 continues the transmission waiting (Step S18).

When the waiting time "ΔT1" elapses, the control unit 13 issues a command to switch the communication channel from the second communication channel CH-2 to the third communication channel CH-3 to the reception unit 11 and the transmission unit 12 (Step S21). The reception unit 11 and the transmission unit 12 switch the communication channel to the third communication channel CH-3 in response to the switching command, and the reception unit 11 and the transmission unit 12 resume wireless communication with the terminals 2 and 3 (Step S22).

When radar is not detected in Step S16 (NO in Step S17), the wireless communication in which the second communication channel CH-2 is used is started (Step S22).

The case where the second communication channel CH-2 is the communication channel in which radar detection is not required in Step S4 (NO in Step S5) will be described below.

In such cases, radar does not exist in the second communication channel CH-2. In other words, because communication is not prohibited by the existence of radar, it is not necessary to set the third communication channel. Therefore, the control unit 13 produces the switching frame including the channel switching element 20 (Step S23). The channel switching element 20 includes not the second notification element 22 but only the first notification element 21 of FIG. 7. At this point, the number corresponding to the second communication channel CH-2 is set at the new channel number 26 of the element 20, and "T1" is set at the channel switching timing 27.

The switching frame produced by the control unit 13 is transmitted from the transmission unit 12 to the terminals 2 and 3 through the antenna 16 (Step S24). The control unit 13 issues the transmission stop command to the transmission unit 12 (Step S25). The transmission unit 12 stops the transmission in which the first communication channel CH-1 is used in response to the transmission stop command.

The control unit 13 confirms whether or not the timing T1 elapses (Step S26). When the timing T1 does not elapse (NO in Step S27), the control unit 13 continues the transmission waiting (Step S28). When the timing T1 elapses (YES in Step S27), the control unit 13 issues the command to switch the communication channel from the first communication channel CH-1 to the second communication channel CH-2 to the reception unit 11 and the transmission unit 12 (Step S29). The reception unit 11 and the transmission unit 12 switch the communication channel to the second communication channel CH-2 in response to the switching command, and the reception unit 11 and the transmission unit 12 resume the wireless communication with the terminals 2 and 3 (Step S22).

(Channel Switching Operation in Terminals)

Figure 15A:
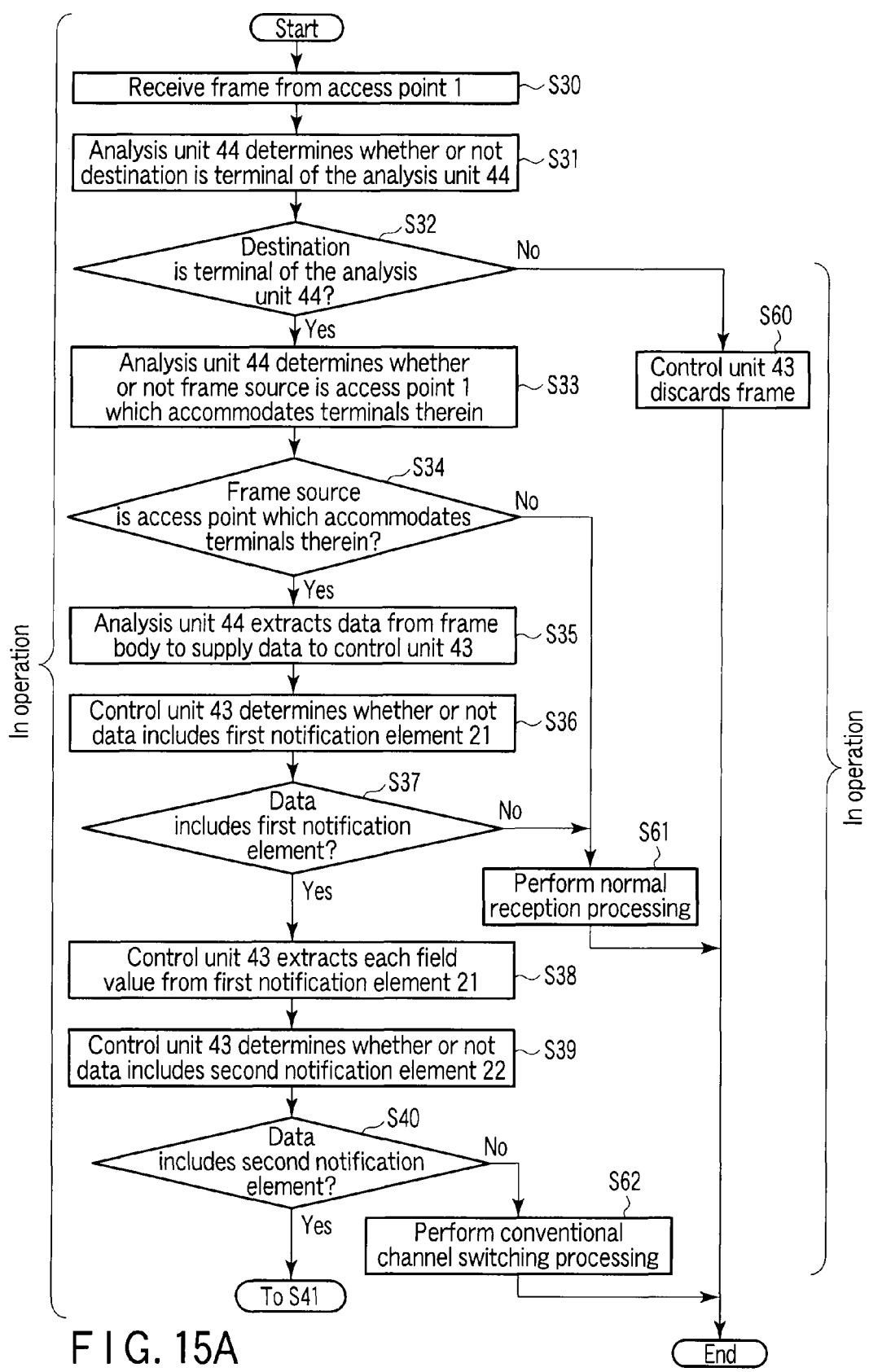
FIGS. 15A, 15B and 16 are flowcharts showing an operation of the terminal according to the first embodiment.
Figure 15B:
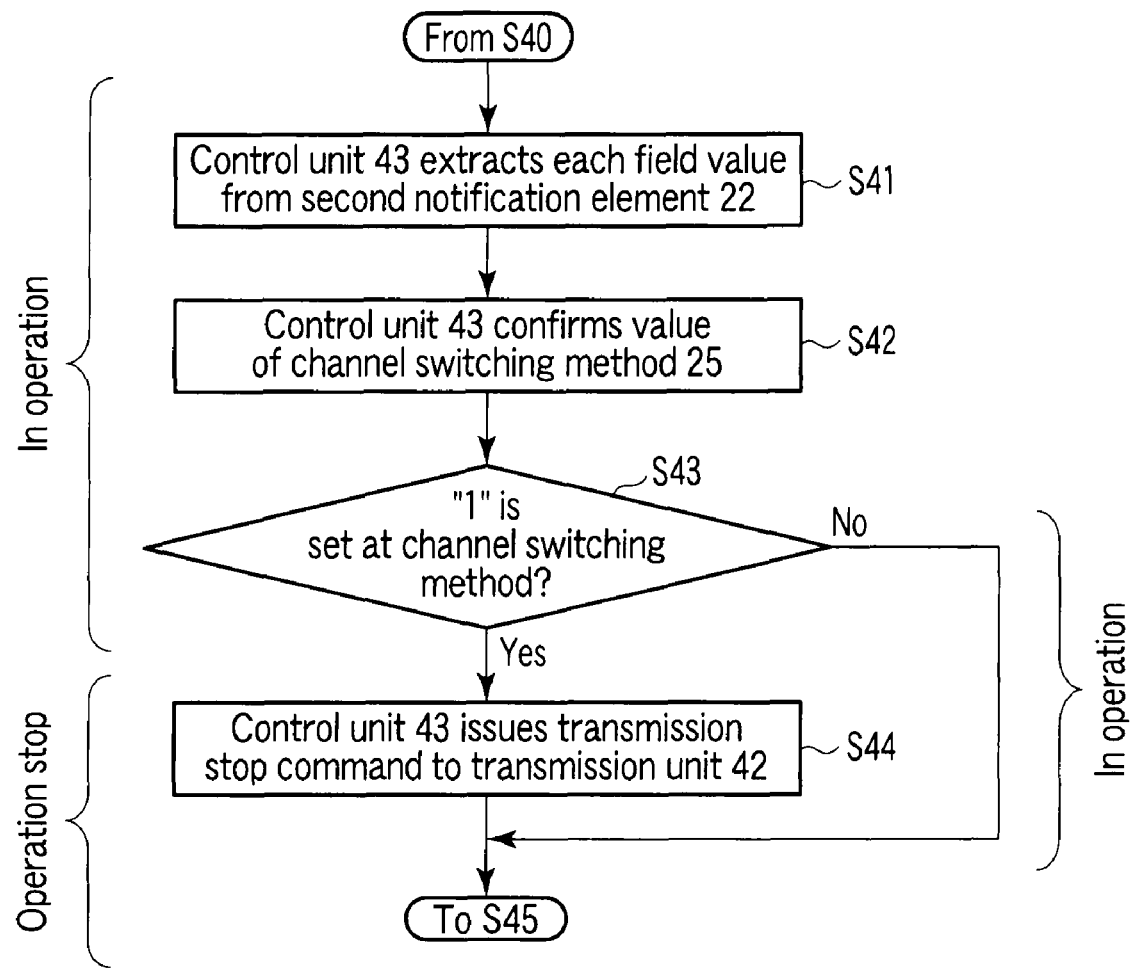
Figure 16:
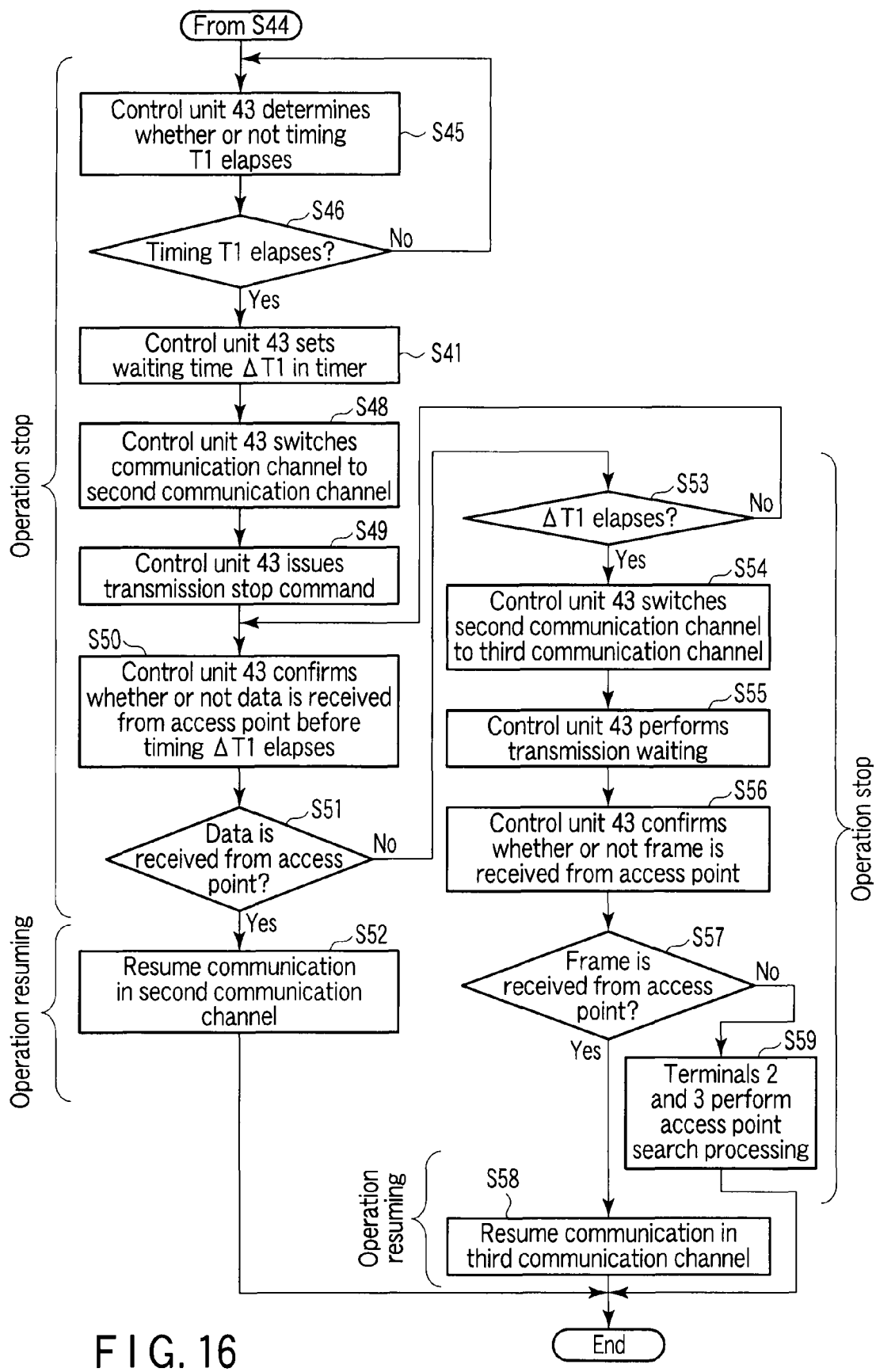

Operations of the terminals 2 and 3, which receive the switching frame, will be described with reference to FIGS. 15A, 15B and 16. FIGS. 15A, 15B and 16 are flowcharts showing the flow of the operations of the terminals 2 and 3.

The terminals 2 and 3 receive the switching frame transmitted in the form of the beacon frame through the antenna 40 (Step S30 of FIG. 15A). The reception unit 41 performs the demodulation processing, in accordance with the IEEE 802.11 standard, on the received radio signal to obtain the frame, and the reception unit 41 supplies the frame to the analysis unit 44. The analysis unit 44 analyzes the supplied frame. The analysis unit 44 confirms the address field of the MAC header to determine whether or not the terminals 2 and 3 are the destination of the frame (Step S31). Examples of the mode of destination information set at the address field are a MAC address, a broadcast address, and a multicast address.

As a result of Step S31, when the terminals 2 and 3 are the destination of the frame (YES in Step S32), the analysis unit 44 notifies the control unit 43 that terminal of the analysis unit 44. The analysis unit 44 analyzes the MAC header to confirm whether or not the frame source is the access point 1 accommodating the terminal 2 and 3 (Step S33).

When the frame source is the access point 1 accommodating the terminals 2 and 3 (YES in Step S34), the analysis unit 44 notifies the control unit 43 that the frame source is the access point 1 accommodating the terminals 2 and 3, and the analysis unit 44 extracts the data from the frame body and supplies the data to the control unit 43 (Step S35). The control unit 43 determines whether or not the data supplied from the analysis unit 43 includes the first notification element 21 (Step S36). The determination in Step S36 can be made based on whether or not the data includes the element ID 23.

When the data includes the first notification element 21 (YES in Step S37), the control unit 43 extracts the value of each field from the first notification element 21 (Step S38). The control unit 43 determines whether or not the data supplied from the analysis unit 43 includes the second notification element 22 (Step S39). The determination in Step S39 can be made based on whether or not the data includes the element ID 28.

When the data includes the second notification element 22 (YES in Step S40), the control unit 43 extracts the value of each field from the second notification element 22 (Step S41 of FIG. 15B). The control unit 43 confirms the value of the channel switching method 25 extracted from the first notification element 21 (Step S42).

When the channel switching method 25 has the value of "1" (YES in Step S43), the control unit 43 issues the transmission stop command to the transmission unit 42 (Step S44). The transmission unit 42 stops the transmission in response to the transmission stop command. When the channel switching method 25 does not have the value of "1" (NO in Step S43), the control unit 43 does not issue the transmission stop command.

Then, the control unit 43 determines whether or not the timing "T1" set at the channel switching timing 27 elapses (Step S45 of FIG. 16). When the timing "T1" elapses (YES in Step S46), the control unit 43 sets the duration "ΔT1" set at the waiting time 30 in the timer included in the control unit 43, and the control unit 43 starts a countdown (Step S47). At the same time, the control unit 43 issues the command to switch the communication channel from the first communication channel CH-1 to the second communication channel CH-2 to the transmission unit 42 and the reception unit 41. The transmission unit 42 and the reception unit 41 switch the communication channel to the second communication channel CH-2 in response to the switching command (Step S48). The control unit 43 issues the transmission stop command to the transmission unit 42 (Step S49). The transmission unit 42 performs the transmission waiting in response to the transmission stop command.

The control unit 43 confirms whether or not the data is received from the access point 1 until the duration "ΔT1" elapses (Step S50). When the data is received from the access point 1 (YES in Step S51), the control unit 43 determines that the communication is resumed in the second communication channel CH-2 at that time, and the control unit 43 permits the transmission unit 42 to perform the transmission. Therefore, the communication between the access point 1 and the terminals 2 and 3 are resumed using the second communication channel (Step S52).

When the data is not received from the access point 1 in the duration "ΔT1" (NO in Step S51 and YES in Step S53), the control unit 43 issues the command to switch the communication channel from the second communication channel CH-2 to the third communication channel CH-3 to the transmission unit 42 and the reception unit 41. The transmission unit 42 and the reception unit 41 switch the communication channel to the third communication channel CH-3 in response to the switching command (Step S54). At the same time, the control unit 43 causes the transmission unit 42 to perform the waiting of the data transmission in a given period (Step S55). The control unit 43 confirms whether or not the data is received from the access point 1 in the given period (Step S56).

When the data is received from the access point 1 (YES in Step S57), the control unit 43 determines that the communication is resumed in the third communication channel CH-3 at that time, and the control unit 43 permits the transmission unit 42 to perform the transmission. Therefore, the communication between the access point 1 and the terminals 2 and 3 are resumed using the third communication channel (Step S58). When the data is not received from the access point 1 (NO in Step S57), the control unit 43 abandons the communication with the access point 1 accommodating the terminal 2 and 3, and the control unit 43 searches for another access point forming BSS (Step S59).

As a result of Step S31, when the destination of the frame is not the terminals 2 and 3 (NO in Step S32), the frame is discarded (Step S60). When the frame source is not the access point 1 accommodating the terminal 2 and 3 (NO in Step S34), and when the frame body does not include the first notification element 21 (NO in Step S37), normal frame processing is performed (Step S61). That is, the communication channel switching processing is not performed. As a result of Step S39, when the frame body does not include the second notification element 22 (NO in Step S40), the conventional processing performed in receiving the switching frame is performed (Step S62). The determination as to whether or not the second notification element 22 is included is identical to the determination as to whether or not the information on the third communication channel is included, and the same holds true for the configurations of FIGS. 8 and 9.

The terminals 2 and 3 stop the operation (transmission) in Steps S45, S46, and S41 of FIG. 16. However, in the case where the channel switching method 25 extracted from the first notification element 21 by the control unit 43 does not have the value of "1" (NO in Step S43 of FIG. 15B), the operation is performed until the control unit 43 issues a command to switch the communication channel to the second communication channel CH-2 to the transmission unit 42 and the reception unit 43.

(Effect)

The following effect (1) is obtained in the wireless communication apparatus of the first embodiment:

(1) The communication channel switching processing can be efficiently performed.

The effect will be described below compared with the case where the switching frame does not include the information on the third communication channel.

First, the case where the switching frame does not include the information on the third communication channel will be described. When radar is detected in the first communication channel in current use, the wireless communication system switches the communication channel from the first communication channel to the second communication channel according to a DFS (Dynamic Frequency Selection) procedure defined in the IEEE 802.11h standard. This is because the communication is prohibited for 30 minutes in the communication channel in which radar is detected under the provision of Radio Law. However, radar may exist in the second communication channel. In such cases, the communication is also prohibited for 30 minutes even if the wireless communication system makes the transition of the communication channel. Because the switching frame cannot also be transmitted, unfortunately, no communication can be conducted between the access point 1 and the terminals 2 and 3. Only the channel switching communication frame can be transmitted in initially detecting radar under the provision of Radio Law.

On the other hand, in the configuration of the first embodiment, the access point 1 specifies at least two communication channels, which become the transition destination when radar is detected, and the information on the specified communication channels is included in the switching frame. The third communication channel in which radar detection is not required is selected from the communication channels. Accordingly, even if the radar is detected in the second communication channel to which the transition is made from the communication channel in current use, the communication channel is further switched to the third communication channel to enable to conduct communication, so that the communication channel switching processing can be efficiently performed and the communication can be efficiently resumed.

Second Embodiment

A wireless communication apparatus and a wireless communication method according to a second embodiment of the invention will be described below. In the second embodiment, the wireless communication is conducted using the bandwidth of 40 MHz. Only the points different from the first embodiment will be described.

(Communication Channel)

A communication channel used in the wireless LAN system according to the second embodiment will be described with reference to FIGS. 17 and 18. FIGS. 17 and 18 are band diagrams showing frequency bands.

Referring to FIGS. 17 and 18, the two communication channels adjacent to each other in the frequency band are used in the wireless LAN system according to the second embodiment. That is, assuming that a first frequency band is the frequency band (a to (a+20) (MHz)) of the communication channel described in the first embodiment, the communication channel having the bandwidth of (a+20) to (a+40) (MHz) adjacent to the first frequency band or the communication channel having the bandwidth of (a−20) to (a (MHz)) adjacent to the first frequency band are simultaneously used. Therefore, communication is conducted using the bandwidth of 40 MHz. Hereinafter the bandwidth of 40 MHz is referred to as the second frequency band.

In the IEEE 802.11a standard, wireless communication is conducted using only the first frequency band. On the other hand, in the IEEE 802.11n standard, as described above, wireless communication can be conducted using not only the first frequency band but also the second frequency band. The second embodiment relates to the wireless communication system in accordance with the IEEE 802.11n standard. In the case where the communication is conducted using the first frequency band, the communication channel switching method is similar to that of the first embodiment. Therefore, the case where the communication is conducted using the second frequency band will be described below.

(Concept of Communication Channel Switching Method)

An overview of the communication channel switching method in the wireless LAN system according to the second embodiment will be described with reference to FIG. 19. FIG. 19 is a band diagram showing a frequency band.

Referring to FIG. 19, similarly to the first embodiment, the communication channel in current use is referred to as the first communication channel CH-1, and the communication channel which is the transition destination is referred to as the second communication channel CH-2 and third communication channel CH-3.

When radar is detected in the first communication channel CH-1, the communication channel used in the wireless LAN system is switched to the second communication channel CH-2. At this point, not only the second communication channel CH-2 but also a fourth communication channel CH-4 adjacent to the second communication channel CH-2 are used. That is, the wireless communication in which the bandwidth of 40 MHz is used is conducted using the second communication channel CH-2 and the fourth communication channel CH-4. The fourth communication channel CH-4 may be adjacent to a low-frequency side of the second communication channel CH-2 (CASE 1 in FIG. 19), and the fourth communication channel CH-4 may be adjacent to a high-frequency side of the second communication channel CH-2 (CASE 2).

When radar is detected in at least one of the second and fourth communication channels CH-2 and CH-4, the communication channel is switched to the third communication channel CH-3. At this point, not only the third communication channel CH-3 but also a fifth communication channel CH-5 adjacent to the third communication channel CH-3 are used. That is, the wireless communication in which the bandwidth of 40 MHz is used is conducted using the third communication channel CH-3 and the fifth communication channel CH-5. The fifth communication channel CH-5 may be adjacent to the low-frequency side of the third communication channel CH-3 (CASE 3 in FIG. 19), and the fifth communication channel CH-5 may be adjacent to the high-frequency side of the third communication channel CH-3 (CASE 4).

The first communication channel CH-1 may have the bandwidth of 20 MHz including only one of the communication channels, or the first communication channel CH-1 may have the bandwidth of 40 MHz including two communication channels.

(Configuration of Access Point 1) A configuration of the access point 1 of the second embodiment will be described below. The access point 1 of the second embodiment has a block configuration similar to that of FIG. 3 of the first embodiment, and only the points different from the first embodiment will be described below.

When producing the switching frame, the control unit 13 causes the switching notification element 20 to include the information indicating whether the fourth and fifth communication channels CH-4 and CH-5 are adjacent to the low-frequency sides or the high-frequency sides of the second and third communication channels CH-2 and CH-3. The configuration of the switching frame is described later.

In response to the command issued from the control unit 13, the radar detection unit 14 monitors the presence or absence of radar in the bandwidth of 40 MHz when communication is conducted in the bandwidth of 40 MHz.

In response to the command issued from the control unit 13, the reception unit 11 and the transmission unit 12 perform reception processing and transmission processing in the bandwidth of 40 MHz when communication is conducted in the bandwidth of 40 MHz.

(Configuration of Wireless Communication Terminals 2 and 3)

Configurations of the terminals 2 and 3 of the second embodiment will be described below. The terminals 2 and 3 of the second embodiment have a block configuration similar to that of FIG. 12 of the first embodiment, and only the points different from the first embodiment will be described below.

When receiving the switching notification element 20 from the analysis unit 44, the control unit 43 recognizes whether the fourth and fifth communication channels CH-4 and CH-5 are adjacent to the low-frequency sides or the high-frequency sides of the second and third communication channels CH-2 and CH-3. The communication channel is switched in the reception unit 41 and the transmission unit 42 according to the information included in the switching notification element 20.

Figure 20:
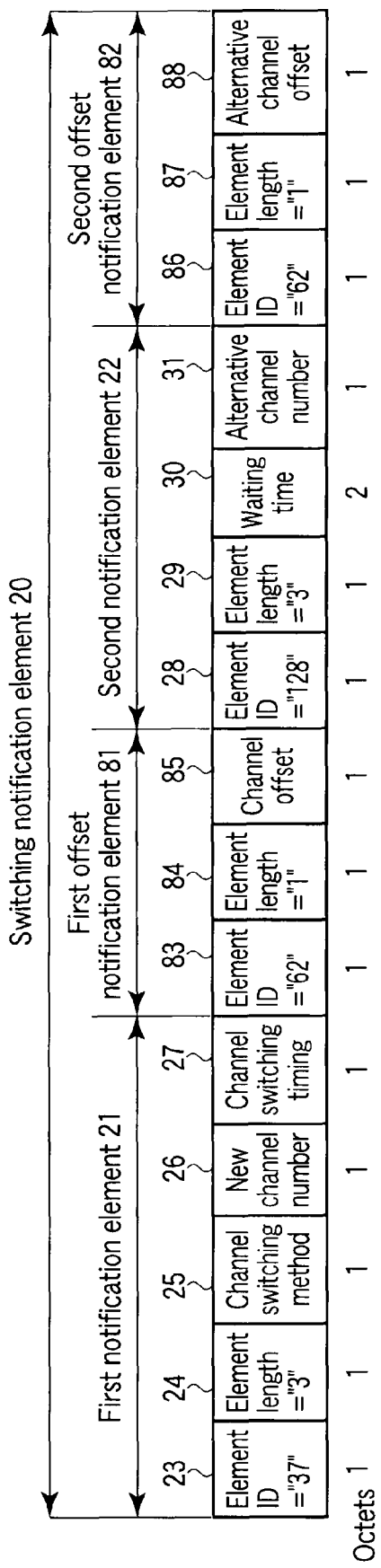
FIGS. 20 to 22 are conceptual diagrams showing a switching notification element according to the second embodiment.
Figure 21:
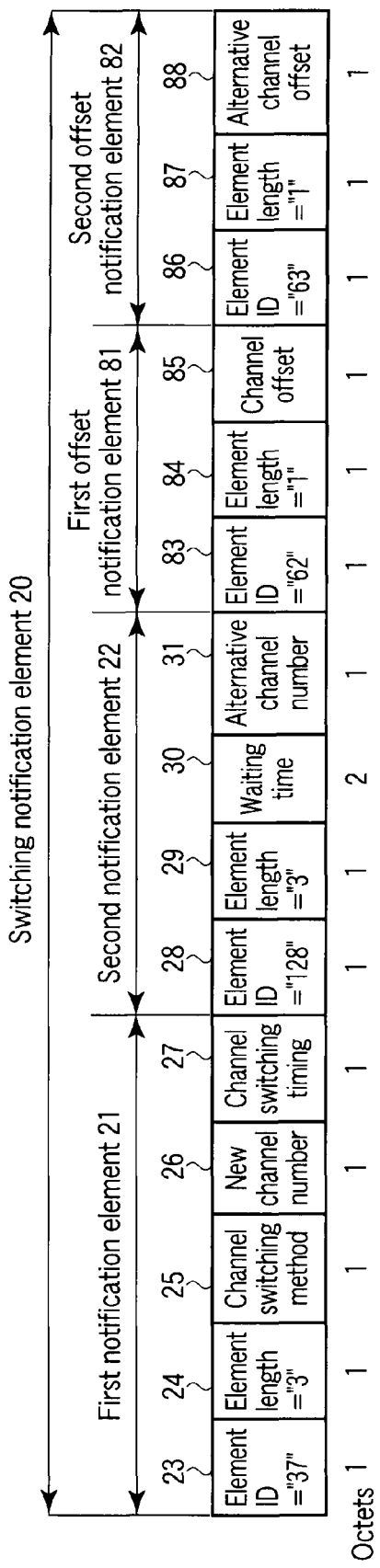
Figure 22:
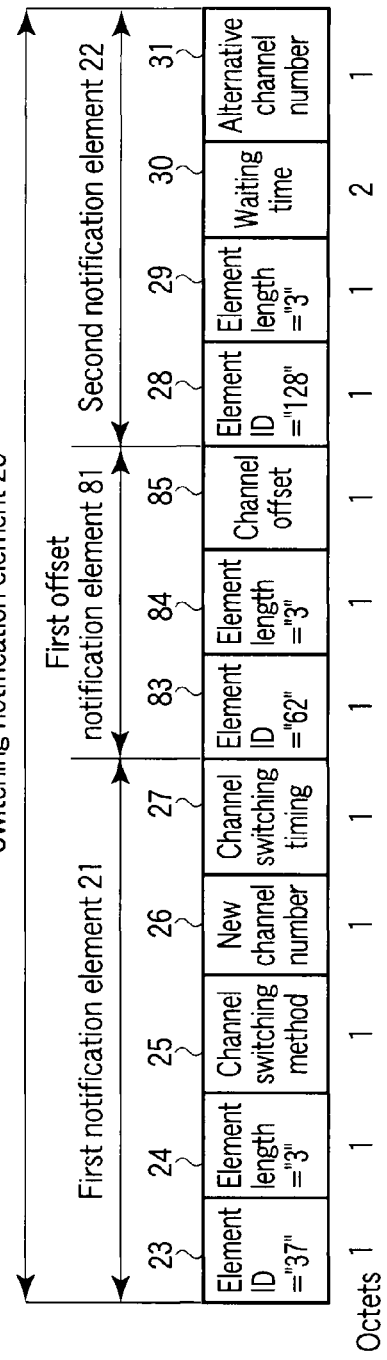

A configuration of the channel switching element 20 of the second embodiment will be described with reference to FIGS. 20 to 22. FIGS. 20 to 22 are schematic diagrams showing the switching notification elements.

(First Format Example of Channel Switching Element 20)

A first format example of the switching notification element 20 will be described with reference to FIG. 20.

Referring to FIG. 20, in the configuration of FIG. 7 as described in the first embodiment, the switching notification element 20 includes a first offset notification element 81 indicating a relationship between the second communication channel CH-2 and the fourth communication channel CH-4 and a second offset notification element 82 indicating a relationship between the third communication channel CH-3 and the fifth communication channel CH-5. The first offset notification element 81 is provided immediately after the first notification element 21, and the second offset notification element 82 is provided immediately after the second notification element 22.

The first offset notification element 81 includes an element ID 83, an element length 84, and a channel offset 85. These pieces of information are 8-bit information.

The element ID 83 is disposed at the leading end of the first offset notification element 81. The frame destination receives the element ID 83 to recognize that the subsequent pieces of data are the first offset notification element 81. Accordingly, plural mutually independent values, which can be used as the element ID 83, are previously defined in the IEEE 802.11 standard. That is, the element ID 83 is distinguished from other elements by the use of the independent value. In the example of FIG. 20, the element ID 83 has a value of "62".

A length of the first offset notification element 81 in which the lengths of the element ID 83 and element length 84 are removed is set as the element length 84 in octet units. In the example of FIG. 20, the value of "1" is set at the element length 84.

The information indicating whether the fourth communication channel CH-4 is adjacent to the low-frequency side or the high-frequency side of the second communication channel CH-2 is set at the channel offset 85. In the case of the channel offset 85 of "1", the fourth communication channel CH-4 is adjacent to the low-frequency side of the second communication channel CH-2 (CASE 1 in FIG. 19). In the case of the channel offset 85 of "3", the fourth communication channel CH-4 is adjacent to the high-frequency side of the second communication channel CH-2 (CASE 2 in FIG. 19). In the case of the channel offset 85 of "0", the fourth communication channel CH-4 is not used, and the communication is conducted using the bandwidth of 20 MHz.

The second offset notification element 82 includes an element ID 86, a channel offset 87, and an alternative channel offset 88. These pieces of information are 8-bit information.

The element ID 86 is disposed at the leading end of the second offset notification element 82. The frame destination receives the element ID 86 to recognize that the subsequent pieces of data are the second offset notification element 82. The element ID 86 may have the same value as the element ID 83. The first offset 81 means the information on the first notification element 21 because the first offset 81 is disposed immediately after the first notification element 21. Therefore, it is found that the second offset notification element 82, which is the remaining information, is information on the second notification element 22. In the example of FIG. 20, the element ID 86 has the value of "62".

A length of the second offset notification element 82 in which the lengths of the element ID 86 and element length 87 are removed is set at the element length 87 in octet units. In the example of FIG. 20, the value of "1" is set at the element length 87.

The information indicating whether the fifth communication channel CH-5 is adjacent to the low-frequency side or the high-frequency side of the third communication channel CH-3 is set at the alternative channel offset 88. In the case of the alternative channel offset 88 of "1", the fifth communication channel CH-5 is adjacent to the low-frequency side of the third communication channel CH-3 (CASE 3 in FIG. 19). In the case of the alternative channel offset 88 of "3", the fifth communication channel CH-5 is adjacent to the high-frequency side of the third communication channel CH-3 (CASE 4 in FIG. 19). In the case of the alternative channel offset 88 of "0", the fifth communication channel CH-5 is not used, and the communication is conducted using the bandwidth of 20 MHz.

(Second Format Example of Channel Switching Element 20)

A second format example of the switching notification element 20 will be described with reference to FIG. 21.

Referring to FIG. 21, in the second format example, the elements of the first format example of FIG. 20 are disposed in the order of the first notification element 21, the second notification element 22, the first offset notification element 81, and the second offset notification element 82.

The values different from each other are set at the element ID 83 and the element ID 86. The values of "62" and "63" are set at the element IDs 83 and 86. The agreement is previously made as follows: The data is the first offset notification element 81 in the case of the value of "62" while the data is the second offset notification element 82 in the case of the value of "63". Therefore, it is no always necessary that the first offset notification element 81 be disposed immediately after the first notification element 21.

(Third Format Example of Channel Switching Element 20)

A third format example of the switching notification element 20 will be described with reference to FIG. 22.

Referring to FIG. 22, in the third format example, the second offset notification element 82 is eliminated from the first format example. In the case of the alternative channel offset 88 of "0", that is, in the case where communication is conducted using the bandwidth of 20 MHz, because the second offset notification element 82 is not required, the third format example may be used.

(Fourth Format Example of Channel Switching Element 20)

A fourth format example of the switching notification element 20 will be described below. The fourth format example has a configuration similar to that of FIG. 9 described in the first embodiment.

The fourth format example of the second embodiment differs from the third format example according to the first embodiment in that CN="22", "23", and "27" of the defined classes of FIG. 10 can be used as the newly defined class 32.

In the defined classes CN="22", "23", and "27", the relationship between the second and third communication channels CH-2 and CH-3 and the fourth and fifth communication channels CH-4 and CH-5 is defined as the operation definition thereof. In the case of the operation definition of "13", the fourth and fifth communication channels CH-4 and CH-5 are located on the high-frequency sides of the second and third communication channels CH-2 and CH-3. In the case of the operation definition of "14", the fourth and fifth communication channels CH-4 and CH-5 are located on the low-frequency sides of the second and third communication channels CH-2 and CH-3.

The channel number defined in each defined class corresponds to the second and third communication channels CH-2 and CH-3. For example, in the case of the channel number of "36" and the newly defined class 32 of "23", the second communication channel CH-2 is the communication channel CH-b and the fourth communication channel CH-4 is the communication channel CH-c. That is, the wireless communication in which the bandwidth of 40 MHz is used is conducted with the communication channels CH-b and CH-c.

(Channel Switching Operation in Access Point)

The operation of the access point 1 according to the second embodiment is similar to that of FIGS. 13A, 13B and 14 of the first embodiment. However, the control unit 13 produces the switching notification element 20 using one of the first to fourth formats of the second embodiment. The second and fourth communication channels are selected from the radar detection necessary channel group, and the third and fifth communication channels are selected from the radar detection unnecessary channel group.

(Channel Switching Operation in Terminals 2 and 3)

The operations of the terminals 2 and 3 receiving the switching frame will be described below. The operations according to the second embodiment are basically similar to those of FIGS. 15A, 15B and 16 described in the first embodiment, so that only the points different from the first embodiment will be described below. The case where the switching notification element 20 having the first format example of FIG. 20 is used will be described by way of example.

In Step S38, the control unit 43 extracts the field values from not only the first notification element 21 but also the first offset notification element 81.

In Step S41, the control unit 43 extracts the respective field values from not only the second notification element 22 but also the second offset notification element 82.

In Step S48, the control unit 43 switches the communication channel to the second and fourth communication channels CH-2 and CH-4. As described above, whether the fourth communication channel CH-4 is located on the low-frequency side or the high-frequency side of the second communication channel CH-2 can be recognized by the value extracted from the first offset notification element 81 in Step S38.

In Step S54, the control unit 43 switches the communication channel to the third and fifth communication channels CH-3 and CH-5. As described above, whether the fifth communication channel CH-5 is located on the low-frequency side or the high-frequency side of the third communication channel CH-3 can be recognized by the value extracted from the second offset notification element 82 in Step S41.

(Effect)

The following effect (2) is obtained in the wireless communication apparatus according to the second embodiment.

(2) The effect (1) is obtained even in the wireless communication system in which communication is conducted using the bandwidth of 40 MHz.

In the configuration according to the second embodiment, the switching notification element 20 described in the first embodiment includes the information indicating whether the fourth and fifth communication channels are adjacent to the low-frequency sides or the high-frequency sides of the second and third communication channels. Accordingly, the effect (1) of the first embodiment is obtained even in the wireless communication system in accordance with the IEEE 802.11 standard in which the communication is conducted with the bandwidth of 40 MHz by using two communication channels having 20-MHz bandwidths.

Third Embodiment

A wireless communication apparatus and a wireless communication method according to a third embodiment of the invention will be described below. The third embodiment relates to the method in which the transition of the communication channel is made when an interference signal other than radar is detected in the first embodiment. Only the points different from the first embodiment will be described below.

(Concept of Interference Signal)

The concept of an interference signal according to the third embodiment will be described with reference to FIG. 23. FIG. 23 is a conceptual diagram showing plural wireless communication systems.

Referring to FIG. 23, the access point 1 according to the third embodiment accommodates the terminals 2 and 3 therein, and the access point 1 forms a first BSS (first wireless communication system) in accordance with the IEEE 802.11 standard. The access point 1 conducts communication with the terminals 2 and 3 using a radio signal 102 in accordance with a wireless LAN method (first communication method).

A second BSS (second wireless communication system) in accordance with the IEEE 802.11 standard exists in proximity to the first BSS. An access point 4 accommodates terminals 5 and 6 therein to form the second BSS. The access point 4 conducts communication with the terminals 5 and 6 using a radio signal 103 in accordance with the wireless LAN method (first communication method).

A third wireless communication system in accordance with a standard different from the IEEE 802.11 standard exists in proximity to the first BSS. In the third wireless communication system, communication is conducted using a radio signal 104 in accordance with a communication method (second communication method) different from the wireless LAN method.

In the case where the three wireless communication systems are brought close to one another, sometimes the radio signal may be detected by a different system. That is, sometimes the radio signal 103 used in the second BSS may be received by the access point 1 of the first BSS. Because the same wireless LAN method is used on both sides, the access point 1 can recognize the radio signal 107. The access point 1 discards the radio signal 103 when recognizing that the access point 1 is not the destination of the radio signal based on the MAC address of the radio signal 103.

Sometimes, the radio signal 104 used in the third wireless communication system breaks into the first BSS. In such cases, because different communication methods are used in both sides, the access point 1 recognizes that the radio signal 104 is a mere electric power.

In each case, the radio signals 103 and 104 are not necessary for the first BSS, and sometimes the signals 103 and 104 break into the first BSS and interfere with the signal in the first BSS. The signals 103 and 104 are the interference signals of the first BSS. The interference signal can be defined as follows: The interference signal is a "signal except for the signal used in the wireless communication system (in the third embodiment, first BSS) to which the access point 1 and the terminals 2 and 3 belong".

The third embodiment relates to the method for switching the communication channel to another communication channel when the interference signal is detected in the communication channel in current use.

(Configuration of Access Point)

A configuration of the access point 1 will be described with reference to FIG. 24. FIG. 24 is a block diagram showing the access point 1 according to the third embodiment.

Referring to FIG. 24, the access point 1 according to the third embodiment has a configuration in which the radar detection unit 14 is replaced by an interference signal detection unit 17 in the configuration of FIG. 3 described in the first embodiment. Only the points different from the access point 1 according to the first embodiment will be described below.

The interference signal detection unit 17 monitors the presence or absence of the interference signal in the digital signal obtained by the reception unit 11. That is, the interference signal detection unit 17 detects whether or not the interference signal exists in the communication channel used by the access point 1. When the interference signal detection unit 17 detects the interference signal, the unit 17 determines that the interference signal 17 is exist and supplies a detection signal to the control unit 13. When the interference signal detection unit 17 does not detect the interference signal, the unit 17 determines that the interference signal 17 is not exist.

The control unit 13 processes the transmission and reception data, and the control unit 13 controls the communication channel used by the reception unit 11 and transmission unit 12. The control unit 13 issues a command to monitor the interference signal to the interference signal detection unit 17. When receiving the detection signal from the interference signal detection unit 17, the control unit 13 produces the switching frame to supply the switching frame to the transmission unit 12. The control unit 13 issues the data transmission stop command to the transmission unit 12 after the frame is transmitted. Then, similarly to the first embodiment, the control unit 13 issues the command to switch the communication channel to the reception unit 11 and the transmission unit 12.

Similarly to the first embodiment, the storage unit 15 retains the information on plural communication channels. However, the storage unit 15 of the third embodiment differs from the storage unit 15 of the first embodiment in that the communication channels are distinguished from one another based on one of an interference signal non-detection channel group, an interference signal detection channel group, and an un-measured channel group. FIG. 25 is a schematic diagram showing information retained in the storage unit 15.

In the communication channel belonging to the interference signal non-detection channel group, the interference signal is not detected in the latest interference signal monitoring result. In the communication channel belonging to the interference signal detection channel group, the interference signal is detected in the latest interference signal monitoring result. In the communication channel belonging to the un-measured channel group, the interference signal is not monitored yet, or the monitoring is not performed since a predetermined duration elapses from the latest monitoring.

(Channel Switching Operation)

Figure 26:
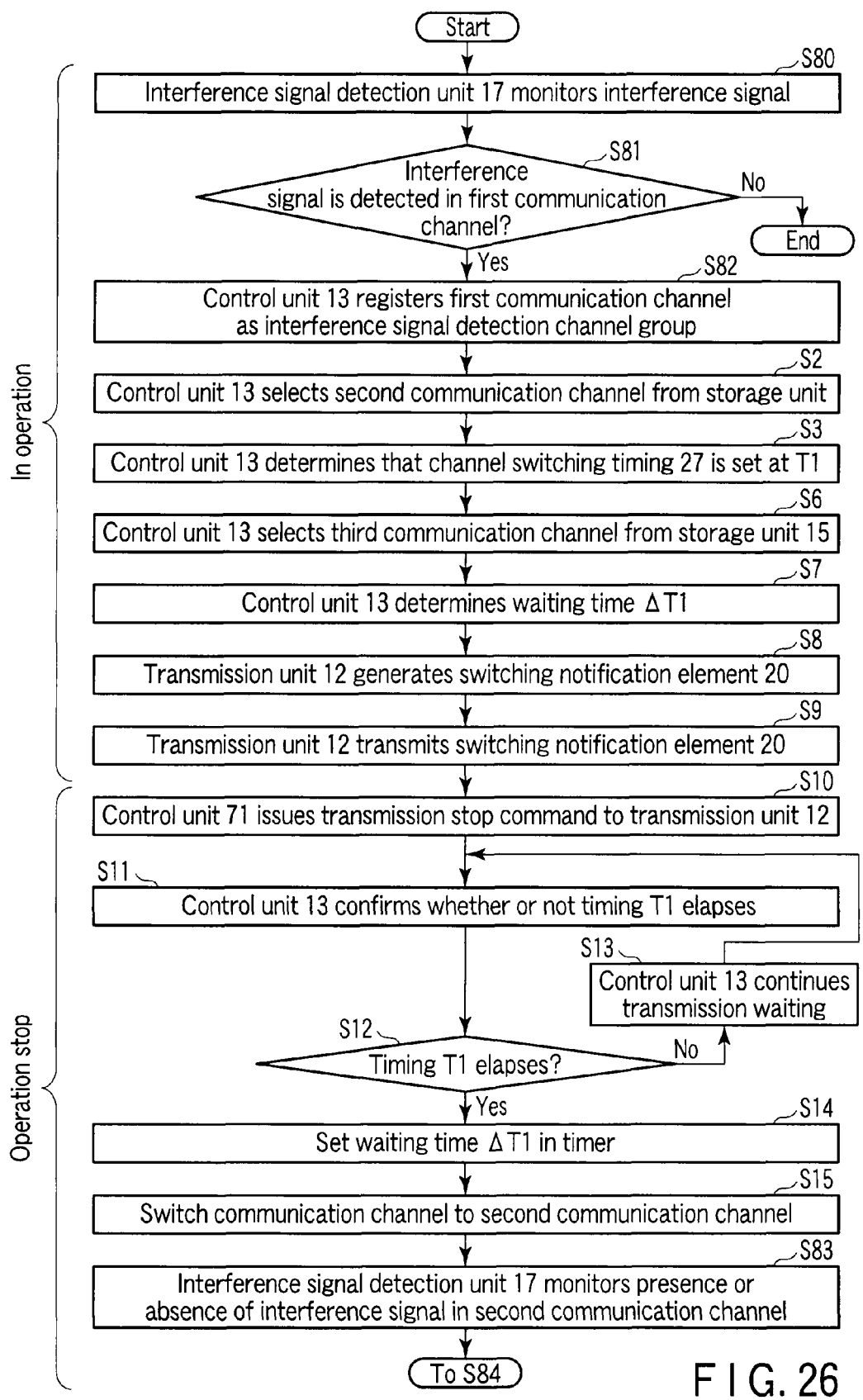
FIGS. 26 and 27 are flowcharts showing an operation of an access point according to the third embodiment.
Figure 27:
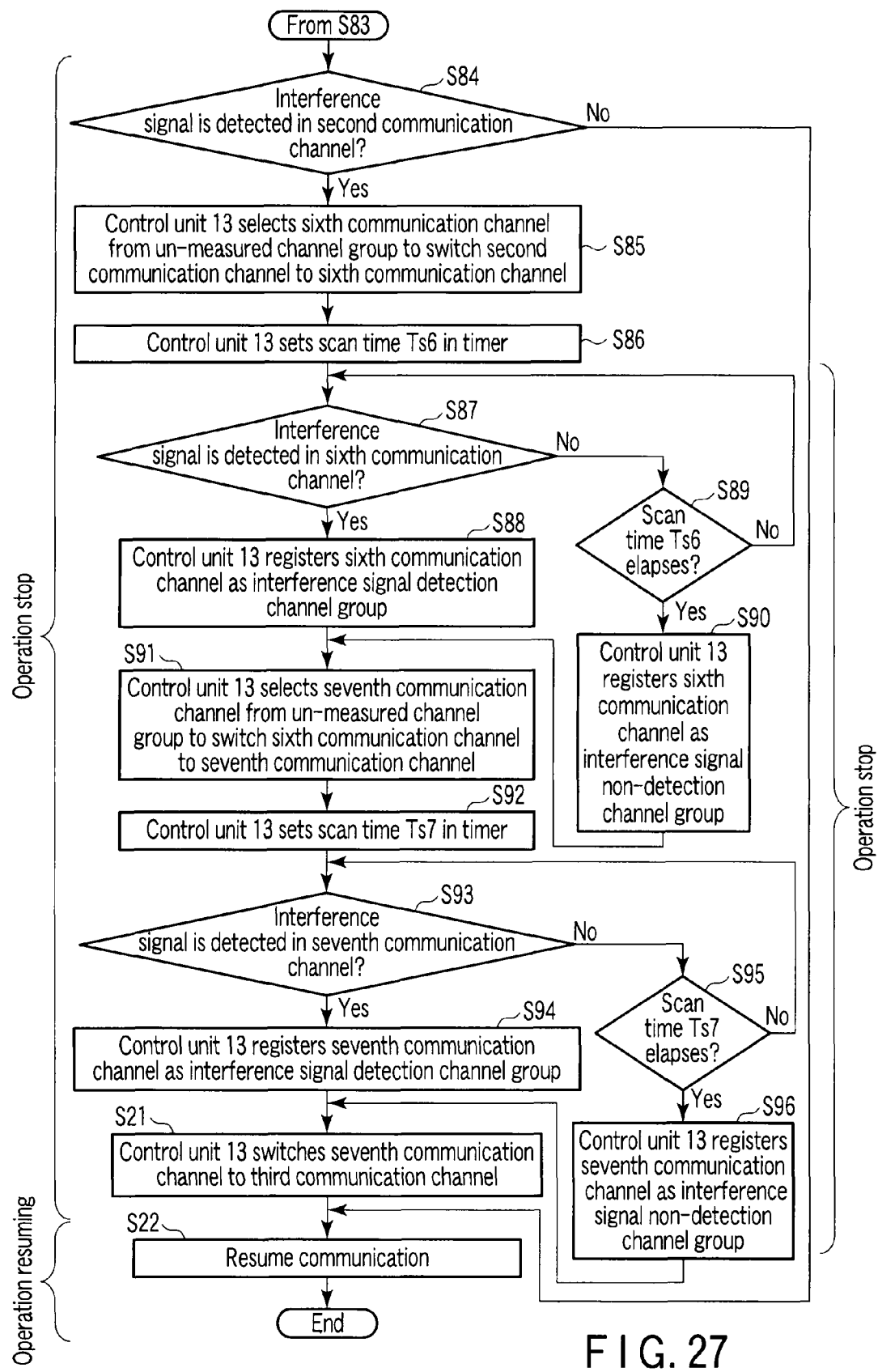

An operation of the access point 1 will be described with reference to FIGS. 26 and 27 while attention focuses on the switching operation of the communication channel. FIGS. 26 and 27 are flowcharts showing the flow of the operation of the access point 1. The case where the switching notification element 20 having the configuration of FIG. 7 is used will be described by way of example. Similarly to the first embodiment, the communication channel in current use is referred to as first communication channel CH-1, the communication channel corresponding to the new channel number is referred to as second communication channel CH-2, and the communication channel corresponding to the alternative channel number is referred to as third communication channel CH-3.

The interference signal detection unit 17 monitors the presence or absence of radar in the first communication channel CH-1 (Step S80 of FIG. 26). When the interference signal is detected (YES in Step S81), the control unit 13 registers the first communication channel CH-1 as the interference signal detection channel group in the storage unit 15 (Step S82). The communication using the first communication channel CH-1 is prohibited. The processing in Steps S2, S3, and S6 to S15 described in the first embodiment are performed. In Step S6 of the third embodiment, the communication channel belonging to the interference signal non-detection channel group is selected as the third communication channel CH-3.

After Step S15 (or simultaneously), the access point 1 issues the command to monitor the interference signal to the interference signal detection unit 17 in order to confirm the presence or absence of an interference signal in the second communication channel CH-2 before communication is conducted using the second communication channel CH-2. The interference signal detection unit 17 monitors the presence or absence of an interference signal in response to the monitoring command (Step S83).

When an interference signal is not detected (NO in Step S84 of FIG. 27), wireless communication is started using the second communication channel (Step S22).

On the other hand, when an interference signal is detected (YES in Step S84), the control unit 13 monitors the interference signal in the communication channel registered as the un-measured channel group. The processing for monitoring the interference signal is performed until the waiting time "ΔT1" set in the timer in Step S14 elapses.

The control unit 13 switches the second communication channel CH-2 to one of the communication channels (hereinafter referred to as a sixth communication channel CH-6) registered as an un-measured channel group (Step S85). The control unit 13 sets a scan time Ts6 in the timer, and the control unit 13 issues the command to monitor the interference signal in the sixth communication channel CH-6 to the interference signal detection unit 17 (Step S86). When an interference signal is detected during the scan time Ts6 (YES in Step S87), the control unit 13 registers the sixth communication channel CH-6 within the interference signal detection channel group (Step S88).

On the other hand, when an interference signal is not detected during the scan time Ts6 (NO in Step S87 and YES in Step S89), the control unit 13 registers the sixth communication channel CH-6 within the interference signal non-detection channel group (Step S90).

The control unit 13 continues to switch the sixth communication channel CH-6 to one of the communication channels (hereinafter referred to as seventh communication channel CH-7) registered within the un-measured channel group (Step S91). The control unit 13 sets a scan time Ts7 in the timer, and the control unit 13 issues the command to monitor an interference signal in the seventh communication channel CH-7 to the interference signal detection unit 17 (Step S92). When an interference signal is detected during the scan time Ts7 (YES in Step S93), the control unit 13 registers the seventh communication channel CH-7 within the interference signal detection channel group (Step S94).

On the other hand, when an interference signal is not detected during the scan time Ts6 (NO in Step S93 and YES in Step S95), the control unit 13 registers the seventh communication channel CH-7 within the interference signal non-detection channel group (Step S96).

At the time the waiting time "$\Delta T1$" elapses, the control unit 13 issues the command to switch the communication channel from the second communication channel CH-2 to the third communication channel CH-3. The wireless communication using the third communication channel CH-3 is resumed in accordance with the switching command (Step S22).

The operations of the terminals 2 and 3 are similar to those described in the first embodiment, so that the description is omitted.

Figure 28:
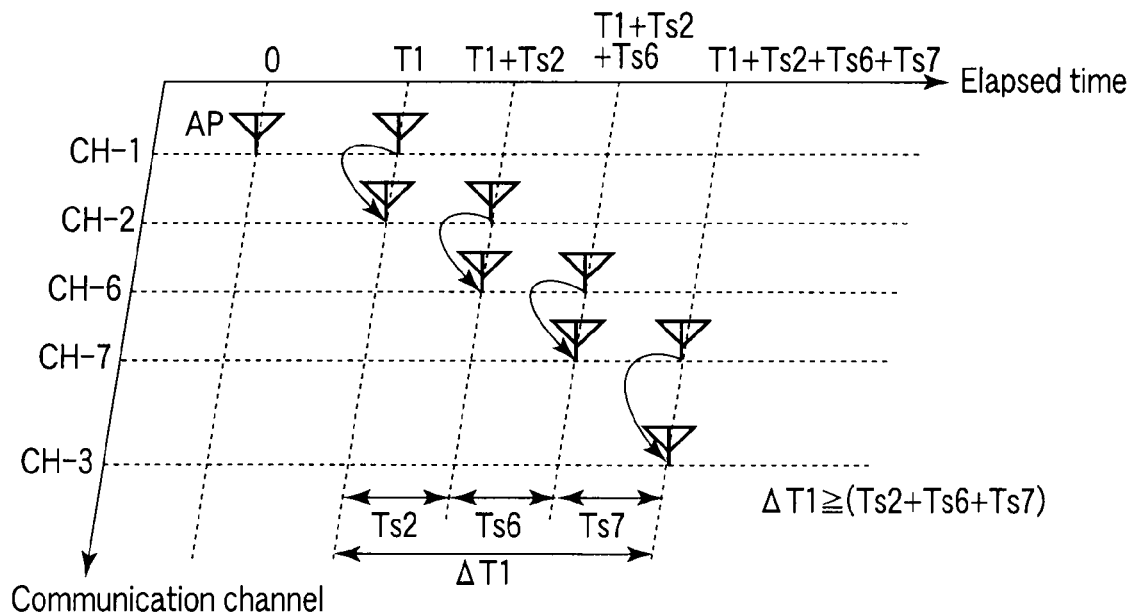
FIGS. 28 and 29 are graphs showing a transition of a communication channel according to the third embodiment.
Figure 29:
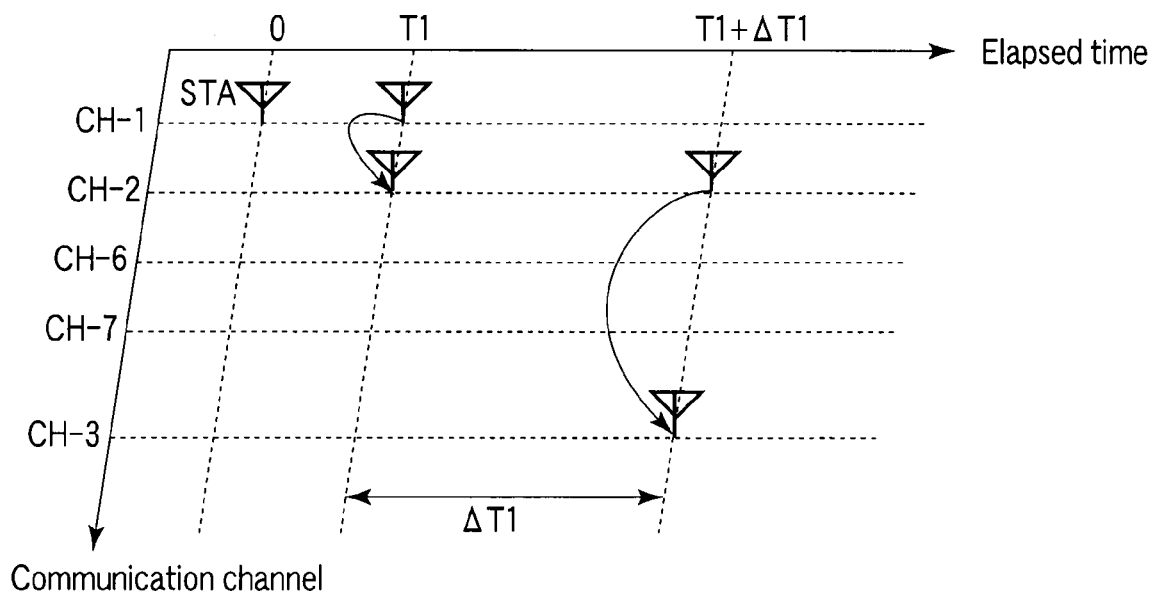

The state in which the communication channel transitions of the access point 1 and terminals 2 and 3 in the operations will be described with reference to FIGS. 28 and 29. FIGS. 28 and 29 are graphs showing the communication channels used by the access point 1 and terminals 2 and 3. The horizontal axis indicates the elapsed time, and the vertical axis indicates the in-use communication channels. In FIGS. 28 and 29, "AP" indicates the communication channel used by the access point 2, and "STA" indicates the communication channel used by the terminals 2 and 3.

The access point 1 will be described with reference to FIG. 28. Referring to FIG. 28, the access point 1 switches the communication channel from the first communication channel CH-1 to the second communication channel CH-2 at the timing T1.

At the time the interference signal is detected in the second communication channel CH-2, the communication channel is switched from the second communication channel CH-2 to the sixth communication channel CH-6 (time (T1+Ts2)). After the presence or absence of the interference signal is monitored during the scan time Ts6, the communication channel is switched from the sixth communication channel CH-6 to the seventh communication channel CH-7 (time (T1+Ts2+Ts6)). After the presence or absence of an interference signal is monitored during the scan time Ts7, the communication channel is switched from the seventh communication channel CH-7 to the third communication channel CH-3 to resume communication at the time the waiting time $\Delta T1$ elapses from the timing T1 (time (T1+Ts2+Ts6+Ts7)). The case where (Ts2+Ts6+Ts7) is equal to $\Delta T1$ is shown in FIG. 28. However, it is necessary that (Ts2+Ts6+Ts7) be not more than $\Delta T1$.

The terminals 2 and 3 will be described below with reference to FIG. 29. Referring to FIG. 29, similarly to the access point 1, the terminals 2 and 3 switch the communication channel from the first communication channel CH-1 to the second communication channel CH-2 at the timing T1. The terminals 2 and 3 switch the second communication channel CH-2 to the third communication channel CH-3 at the time (T1+$\Delta T1$) elapses. Unlike the access point 1, the terminals 2 and 3 do not switch the communication channel to the sixth communication channel CH-6 and the seventh communication channel CH-7. The reason why the access point 1 switches the communication channel to the sixth communication channel CH-6 and the seventh communication channel CH-7 is that the presence or absence of the interference signal is only monitored in the sixth communication channel CH-6 and the seventh communication channel CH-7.

(Effect)

The following effect (3) is obtained in the wireless communication apparatus of the third embodiment.

(3) The effect similar to the effect (1) even if the interference signal is detected.

As described above, sometimes the communication efficiency may be deteriorated in the case where a interference signal exists in the in-use communication channel. Accordingly, in such cases, it is necessary to switch the communication channel to another communication channel. However, when an interference signal exists in the switched communication channel, unfortunately, communication efficiency is also deteriorated.

In the configuration of the third embodiment, the access point 1 specifies at least two communication channels which become the transition destination when an interference signal is detected, and the information on the specified communication channels is included in the switching frame. The access point 1 selects the third communication channel as at least one of the communication channels, and an interference signal is not detected by the latest monitoring in the third communication channel. Accordingly, even if an interference signal is detected again in the second communication channel to which the transition is made from the first communication channel in current use, efficient communication can be realized by further switching the communication channel to the third communication channel.

In the third embodiment, the interference signal is monitored in the communication channel belonging to the un-measured channel group by utilizing the communication waiting time "$\Delta T1$". Therefore, the information on the presence or absence of an interference signal in each communication channel can be updated to improve the reliability of the information stored in the storage unit 15.

In the third embodiment, the presence or absence of an interference signal is monitored in the sixth and seventh communication channels CH-6 and CH-7. Alternatively the presence or absence of an interference signal may be monitored in one or at least three communication channels. The monitoring is not limited to the communication channels belonging to the un-measured channel group, and the monitoring may be performed in the communication channels belonging to the interference signal detection channel group or the interference signal non-detection channel group. Therefore, the reliability of the information stored in the storage unit 15 can be further improved.

In the third embodiment, the wireless LAN system in accordance with the IEEE 802.11a standard is described by way of example. However, similarly to the second embodiment, the third embodiment can be applied to the wireless LAN system in accordance with the IEEE 802.11n standard. In such cases, the effect (3) is obtained even in the communication with the bandwidth of 40 MHz.

In the third embodiment, the interference signal detection unit 16 may monitor not only an interference signal but also radar, and the processing described in the first or second embodiment may be performed when radar is not detected. At this point, the effects (1) and (2) described in the first and second embodiments are simultaneously obtained.

Thus, the wireless communication apparatus 1 according to the first to third embodiments of the invention includes the transmission and reception unit (reception unit 11 and transmission unit 12), the monitoring unit (radar detection unit 14 or interference signal detection unit 17), and the control unit 13. The monitoring units 14 and 17 monitor the presence or absence of an interference signal which is for a signal other than the signal used in the communication in the first wireless communication system (radio signal used in BSS formed by the wireless communication apparatus 1) in the first communication channel CH-1, which is the communication channel used by the transmission and reception unit 12. The control unit 13 selects the second and third communication channels CH-2 and CH-3 which are different from the first communication channel CH-1. The transmission and reception unit 12 transmits the instruction frame (switching frame) to the terminals 2 and 3 when the interference signal is detected in the first communication channel CH-1. The instruction frame includes information on the second and third communication channels CH-2 and CH-3. The instruction frame (switching frame) instructs the communication terminals 2 and 3 to switch the communication channel from the first communication channel CH-1 to at least one of the second and third communication channels CH-2 and CH-3. Therefore, the communication channel can be efficiently switched.

In the first to third embodiments, desirably, usage rates of the plural usable communication channels become even. Accordingly, in the case where the communication channel is switched to the third communication channel, the communication in the third communication channel CH-3 is a communication channel in temporal use, and desirably the communication channel is switched from the third communication channel CH-3 after a predetermined time elapses.

When selecting the communication channel, the control unit 13 may randomly select the communication channel from both the radar detection unnecessary channel group and the radar detection necessary channel group, or the control unit 13 may preferentially select the communication channel from the communication channels with the high frequencies. In numbering the communication channels as the first, second, and third channels, the control unit 13 may select an even-numbered channel or an odd-numbered channel from the numbered communication channels. The technique used for selecting the communication channel can be appropriately selected such that a particular algorithm is used.

The channel switching timing 27 included in the switching notification element 20 may be information on the timing at which the first communication channel is switched to the second communication channel. Accordingly, similarly to the waiting time 30, the switching timing 27 may be the waiting time in the first communication channel. Similarly, the waiting time 30 may be information on the timing at which the second communication channel is switched to the third communication channel. Accordingly, the waiting time 30 is not the waiting time in the second communication channel but information on the switching timing.

In the embodiments, the switching frame is included in the frame body of the beacon frame. Alternatively, the switching frame may be included in the frame body of the action frame. In such cases, the action frame may be transmitted in the broadcast or uni-cast fashion.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus which accommodates a wireless communication terminal therein to form a first wireless communication system and communicates with the wireless communication terminal by a first communication method, the wireless communication apparatus comprising:

a transmission and reception unit which transmits and receives a frame to and from the wireless communication terminal using a communication channel;

a monitoring unit which monitors presence or absence of an interference signal in a first communication channel which is the communication channel currently used by the transmission reception unit, the interference signal being a signal other than a signal used in the communication conducted by the first wireless communication system; and a control unit which selects a second communication channel and a third communication channel, the second and the third communication channels being different from the first communication channel, the transmission and reception unit transmitting an instruction frame to the wireless communication terminal when the monitoring unit detects the interference signal in the first communication channel, the instruction frame including information on the second and third communication channels, the instruction frame instructing the wireless communication terminal to switch the communication channel from the first communication channel to at least one of the second and third communication channels, wherein the transmission and reception unit communicates with the wireless communication terminal using a frequency band including the second communication channel and a fourth communication channel whose frequency is adjacent to that of the second communication channel, and using a frequency band including the third communication channel and a fifth communication channel whose frequency is adjacent to that of the third communication channel, and the instruction frame includes information indicating whether each of the fourth and fifth communication channels is adjacent to a low-frequency side or a high-frequency side of each of the second and third communication channels.

2. The apparatus according to claim 1, further comprising a storage unit, wherein the interference signal is radar, the storage unit retains information on the communication channel in which monitoring of the radar is unnecessary, and the control unit selects one of the communication channels retained in the storage unit as at least one of the second and third communication channels.

3. The apparatus according to claim 1, further comprising a storage unit,
wherein the interference signal is a first radio signal or a second radio signal, the first radio signal being supplied from a second wireless communication system, the second wireless communication system conducting communication by the first communication method, the second wireless communication system being different from the first wireless communication system, the second radio signal being supplied from a third wireless communication system, the third wireless communication system conducting communication by a second communication method, the second communication method being different from the first communication method,
the storage unit retains information on the communication channel in which the interference signal is not detected, and
the control unit selects one of the communication channels retained in the storage unit.

4. The apparatus according to claim 1, wherein the instruction frame includes:
a timing information indicating a timing at which the wireless communication terminal switches the communication channel from the first communication channel to the second communication channel, and
the timing information is the number of times the wireless communication terminal receives a beacon frame after receiving the instruction frame.

5. The apparatus according to claim 1, wherein the instruction frame includes:
a timing information indicating a timing at which the wireless communication terminal switches the communication channel from the second communication channel to the third communication channel, and
the timing information is a duration for which the wireless communication terminal is caused to wait in the second communication channel.

6. A wireless communication apparatus which accommodates a wireless communication terminal therein to form a first wireless communication system and communicates with the wireless communication terminal by a first communication method, the wireless communication apparatus comprising:
a transmission and reception unit which transmits and receives a frame to and from the wireless communication terminal using a communication channel;
a monitoring unit which monitors presence or absence of an interference signal in a first communication channel which is the communication channel currently used by the transmission reception unit, the interference signal being a signal other than a signal used in the communication conducted by the first wireless communication system; and
a control unit which selects a second communication channel and a third communication channel, the second and the third communication channels being different from the first communication channel, the transmission and reception unit transmitting an instruction frame to the wireless communication terminal when the monitoring unit detects the interference signal in the first communication channel, the instruction frame including information on the second and third communication channels, the instruction frame instructing the wireless communication terminal to switch the communication channel from the first communication channel to at least one of the second and third communication channels,
wherein the instruction frame includes:
a first timing information indicating a timing at which the wireless communication terminal switches the communication channel from the first communication channel to the second communication channel; and
a second timing information indicating a timing at which the wireless communication terminal switches the communication channel from the second communication channel to the third communication channel.

7. The apparatus according to claim 6, further comprising a storage unit,
wherein the interference signal is radar,
the storage unit retains information on the communication channel in which monitoring of the radar is unnecessary, and
the control unit selects one of the communication channels retained in the storage unit as at least one of the second and third communication channels.

8. The apparatus according to claim 6, further comprising a storage unit,
wherein the interference signal is a first radio signal or a second radio signal, the first radio signal being supplied from a second wireless communication system, the second wireless communication system conducting communication by the first communication method, the second wireless communication system being different from the first wireless communication system, the second radio signal being supplied from a third wireless communication system, the third wireless communication system conducting communication by a second communication method, the second communication method being different from the first communication method,
the storage unit retains information on the communication channel in which the interference signal is not detected, and
the control unit selects one of the communication channels retained in the storage unit.

9. The apparatus according to claim 6, wherein the first timing information is the number of times the wireless communication terminal receives a beacon frame after receiving the instruction frame.

10. The apparatus according to claim 6, wherein the second timing information is a duration for which the wireless communication terminal is caused to wait in the second communication channel.

11. A wireless communication apparatus comprising:
a transmission and reception unit that transmits and receiving a frame to and from the wireless communication terminal using first to third communication channels, the transmission and reception unit that receives an instruction frame supplied from the wireless communication base station, the instruction frame including information on the second and third communication channels and timing information indicating the timing at which the second communication channel is switched to the third communication channel, the second and third communication channels being different from the first communication channel; and
a control unit which instructs the transmission and reception unit to switch from the first communication channel to the second communication channel when the transmission and reception unit receives the command frame, the control unit instructing the transmission and reception unit to switch from the second communication channel to the third communication channel when the transmission and reception unit does not receive the frame from the wireless communication base station until the timing indicated by the timing information since the first communication channel is switched to the second communication channel.

12. The apparatus according to claim 11, wherein at least one of the second and third communication channels is a communication channel in which radar monitoring is unnecessary.

13. The apparatus according to claim 11, wherein the transmission and reception unit communicates with the wireless communication terminal, using a frequency band including the second communication channel and a fourth communication channel whose frequency is adjacent to that of the second communication channel, and using a frequency band including the third communication channel and a fifth communication channel whose frequency is adjacent to that of the third communication channel, and the instruction frame includes information indicating whether each of the fourth and fifth communication channels is adjacent to a low-frequency side or a high-frequency side of each of the second and third communication channels.

14. A wireless communication method comprising:

monitoring presence or absence of an interference signal in a first communication channel;

selecting a second communication channel and a third communication channel in place of the first communication channel when the interference signal is detected; and transmitting an instruction frame to instruct to switch from the first communication channel to the second communication channel and to switch from the second communication channel to the third communication channel;

switching from the first communication channel to the second communication channel after the instruction frame is transmitted;

monitoring the interference signal in the second communication channel after switching to the second communication channel; and switching from the second channel to the third communication channel when the interference signal is detected in the second communication channel, wherein the second communication channel is switched to the third communication channel after a waiting time included in the instruction frame elapses since the timing at which the first communication channel is switched to the second communication channel, when the interference signal is detected in the second communication channel.

15. The method according to claim 14, wherein the interference signal is radar.

16. The method according to claim 14, wherein one of the second and third communication channels is a communication channel in which radar monitoring is unnecessary.

17. The method according to claim 14, wherein the interference signal is a radio signal transmitted from a wireless communication system in which a wireless communication method different from a wireless communication method used to transmit the instruction frame is used.

18. The method according to claim 14, wherein one of the second and third communication channels is a communication channel in which the interference signal is not detected as a result of the interference signal monitoring.

\* \* \* \* \*